(12) United States Patent
Hulaj et al.

(10) Patent No.: US 7,941,450 B2
(45) Date of Patent: May 10, 2011

(54) SOFTWARE, DEVICES AND METHODS FACILITATING EXECUTION OF SERVER-SIDE APPLICATIONS AT MOBILE DEVICES

(75) Inventors: Steven J. Hulaj, Windsor (CA); Tim Neil, Windsor (CA)

(73) Assignee: Nextair Corporation, Waterloo, Ontario (CA)

( * ) Notice: Subject to any disclaimer, the term of this patent is extended or adjusted under 35 U.S.C. 154(b) by 313 days.

(21) Appl. No.: 12/347,193

(22) Filed: Dec. 31, 2008

(65) Prior Publication Data

US 2009/0177663 A1      Jul. 9, 2009

Related U.S. Application Data

(63) Continuation of application No. 09/846,781, filed on May 2, 2001, now Pat. No. 7,546,298.

(60) Provisional application No. 60/260,223, filed on Jan. 9, 2001.

(51) Int. Cl.
   *G06F 17/30* (2006.01)
(52) U.S. Cl. .......................... 707/793; 707/758; 455/566
(58) Field of Classification Search .................. 707/793, 707/758; 455/566
   See application file for complete search history.

(56) References Cited

U.S. PATENT DOCUMENTS

| | | | |
|---|---|---|---|
| 6,067,582 A | 5/2000 | Smith et al. | |
| 6,151,643 A | 11/2000 | Cheng et al. | |
| 6,167,253 A | 12/2000 | Farris et al. | |
| 6,205,330 B1 | 3/2001 | Winbladh | |
| 6,292,186 B1 | 9/2001 | Lehman et al. | |
| 6,347,398 B1 | 2/2002 | Parthasarathy et al. | |
| 6,356,905 B1 | 3/2002 | Gershman et al. | |
| 6,438,575 B1 | 8/2002 | Khan et al. | |
| 6,496,979 B1 | 12/2002 | Chen et al. | |
| 6,559,773 B1 | 5/2003 | Berry | |
| 6,590,589 B1 | 7/2003 | Sluiman et al. | |
| 6,629,284 B1 | 9/2003 | Leermakers | |
| 6,701,521 B1 | 3/2004 | McLlroy et al. | |
| 7,010,573 B1 | 3/2006 | Saulpaugh et al. | |
| 7,051,080 B1 * | 5/2006 | Paul et al. | 709/217 |

(Continued)

FOREIGN PATENT DOCUMENTS

WO    WO 2006089390 A1    8/2006

OTHER PUBLICATIONS

Huy Q. Phan, USPTO Office Communication dated Aug. 31, 2009 in relation to U.S. Appl. No. 11/459,054.

*Primary Examiner* — Debbie Le

(57) ABSTRACT

Software, devices and methods allowing varied mobile devices to interact with server side software applications are disclosed. Data from an application executing at a computing device is presented at a remote wireless device by providing the device an application definition file, containing definitions for a user interface format for the application at the wireless device; the format of network messages for exchange of data generated by the application; and a format for storing data related to the application at the wireless device. Using these definitions, the wireless device may receive data from the application in accordance with the definition and present an interface for the application. Preferably, the application definition file is an XML file. Similarly, application specific network messages provided to the device are also formed using XML. Data from the application may be presented at the mobile device by virtual machine software that uses the application definition file.

10 Claims, 51 Drawing Sheets

U.S. PATENT DOCUMENTS

| | | |
|---|---|---|
| 7,062,535 B1 | 6/2006 | Stark et al. |
| 7,191,211 B2 | 3/2007 | Tuli |
| 7,200,390 B1 | 4/2007 | Henager et al. |
| 7,219,305 B2 * | 5/2007 | Jennings ................ 715/761 |
| 2001/0044321 A1 | 11/2001 | Ausems et al. |
| 2002/0006124 A1 | 1/2002 | Jimenez et al. |
| 2002/0073399 A1 | 6/2002 | Golden |
| 2002/0112078 A1 * | 8/2002 | Yach ........................ 709/246 |
| 2002/0160745 A1 | 10/2002 | Wang |
| 2002/0181060 A1 | 12/2002 | Huang |
| 2003/0060896 A9 | 3/2003 | Hulai |
| 2003/0096605 A1 | 5/2003 | Schlieben et al. |
| 2003/0105845 A1 | 6/2003 | Leemakers |
| 2003/0187952 A1 | 10/2003 | Young et al. |
| 2003/0237050 A1 | 12/2003 | Davidov et al. |
| 2004/0224674 A1 | 11/2004 | O'Farrell et al. |
| 2005/0014494 A1 | 1/2005 | Owen et al. |
| 2005/0059426 A1 | 3/2005 | Aarnio et al. |
| 2006/0047665 A1 | 3/2006 | Neil |
| 2006/0190569 A1 | 8/2006 | Neil et al. |
| 2006/0246879 A1 | 11/2006 | Miller et al. |
| 2007/0150601 A1 | 6/2007 | Angelica |

* cited by examiner

FIG. 11

```
<ARML>
    <HEAD>...</HEAD>
    <SYS>
        <QUERY>
            <PLATFORMS>
                <PLATFORM>WinCE</PLATFORM>
            </PLATFORMS>
        </REG>
    </SYS>
</ARML>
```
⎫ 72

```
<ARML>
    <HEAD>...</HEAD>
    <SYS>
        <QUERYRESP>
            <APP>Order Entry</APP>
            <APP>Helpdesk</APP>
            <APP>Engineer Dispatch</APP>
        </QUERYRESP>
    </SYS>
</ARML>
```
⎫ 74

```
<ARML>
    <HEAD>...</HEAD>
    <SYS>
        <REG TYPE="ADD">
            <CLIENTID>SUNTRESS</CLIENTID>
            <MOBILEID>867452</MOBILEID>
            <NEWMOBILEID>268625</NEWMOBILEID>
            <PLATFORMS>
                <PLATFORM>WinCE</PLATFORM>
            </PLATFORMS>
        </REG>
    </SYS>
</ARML>
```
⎫ 76

```
<ARML>
    <HEAD>...</HEAD>
    <SYS>
        <REGCONFIRM TYPE="ADD">
            <MOBILEID>268625</MOBILEID>
            <VALUE>CONFIRM</VALUE>
            <INTERFACE>
                <BUTTONS NUM="1">
                    <BTN NAME="OK" CAPTION="Send" INDEX="0">
                    </BTN>
                </BUTTONS>
                <EDITBOXES NUM="3">
                    <EB NAME="To" INDEX="1"></EB>
                    <EB NAME="Subject" INDEX="2"></EB>
                    <EB NAME="Body" INDEX="3"></EB>
                </EDITBOXES>
            </INTERFACE>
        </REGCONFIRM>
    </SYS>
</ARML>
```
⎫ 78

FIG. 15C

```
<AXDATAPACKET BODY="ME" SENDTOMOBILE="NO" SENDTOAPP="YES">
  <TABLEUPDATES>

<TUPDATE TABLE="SENTITEMS" UPDATETYPE="ADD" WHERETYPE="PROP"
           SECTION="MAIL" MULTIROW="NO">
    <FIELDS>
      <PKGFLD NAME="LNGMESSAGEID" PARAMTYPE="PROP">MSGID</PKGFLD>
      <PKGFLD NAME="VARFROM" PARAMTYPE="PROP">FROM</PKGFLD>
      <PKGFLD NAME="VARSUBJECT" PARAMTYPE="PROP">SUBJECT</PKGFLD>
      <PKGFLD NAME="MEMBODY" PARAMTYPE="VALUE">DATA</PKGFLD>
    </FIELDS>
  </TUPDATE>

<TUPDATE TABLE="RECIPIENTS" UPDATETYPE="ADD" WHERETYPE="PROP"
           SECTION="RECIPS" MULTIROW="YES" MULTIROWIDENT="RCP">
    <FIELDS>
      <PKGFLD NAME="LNGMESSAGEID" PARAMTYPE="PROP">MSGID</PKGFLD>
      <PKGFLD NAME="VARFULLNAME" PARAMTYPE="PROP">TO</PKGFLD>
      <PKGFLD NAME="VARADDRESS" PARAMTYPE="PROP">ADDRESS</PKGFLD>
    </FIELDS>
  </TUPDATE>

</TABLEUPDATES>
</AXDATAPACKET>
```

104  
106  
108

Appendix "A"

ARML Language Specification

FIG. 16A

Contents

| | | |
|---|---|---|
| 1 | Introduction | FIG. 16E |
| 1.1 | Purpose of document | FIG. 16E |
| 1.2 | Audience | FIG. 16E |
| 1.3 | Definitions & Acronyms | FIG. 16E |
| 2 | ARML Overview | FIG. 16F |
| 2.1 | ARML design considerations | FIG. 16F |
| 2.2 | ARML usage | FIG. 16G |
| 2.3 | The ARML prolog | FIG. 16G |
| 2.4 | The scratchpad area | FIG. 16G |
| 3 | ARML application definition | FIG. 16H |
| 3.1 | General | FIG. 16H |
| 3.1.1 | Description | FIG. 16H |
| 3.1.2 | Structure | FIG. 16H |
| 3.1.3 | Tags | FIG. 16H |
| 3.2 | Table Definitions Section | FIG. 16I |
| 3.2.1 | Description | FIG. 16I |
| 3.2.2 | Structure | FIG. 16I |
| 3.2.3 | Tags | FIG. 16I |
| 3.2.4 | Example | FIG. 16J |
| 3.3 | Package Definitions Section | FIG. 16K |
| 3.3.1 | Description | FIG. 16K |
| 3.3.2 | Structure | FIG. 16K |
| 3.3.3 | Tags | FIG. 16K |
| 3.3.4 | Example | FIG. 16M |
| 3.4 | Device Interface Definitions Section | FIG. 16N |
| 3.4.1 | Description | FIG. 16N |
| 3.4.2 | Structure | FIG. 16N |
| 3.4.3 | Tags | FIG. 16N |
| 3.4.4 | Example | FIG. 16O |
| 4 | Application-defined packages | FIG. 16P |
| 4.1 | General | FIG. 16P |
| 4.1.1 | Description | FIG. 16P |
| 4.1.2 | Structure | FIG. 16P |
| 4.1.3 | Tags | FIG. 16P |
| 4.2 | Package information | FIG. 16Q |
| 4.2.1 | Example | FIG. 16Q |
| 5 | Screen Definitions | FIG. 16S |
| 5.1 | General | FIG. 16S |
| 5.1.1 | Description | FIG. 16S |
| 5.1.2 | Structure | FIG. 16S |
| 5.1.3 | Tags | FIG. 16S |
| 5.2 | Menu definition section | FIG. 16T |

FIG. 16B

| | | |
|---|---|---|
| 5.2.1 | Description | FIG. 16T |
| 5.2.2 | Structure | FIG. 16T |
| 5.2.3 | Tags | FIG. 16U |
| 5.3 | Buttons definition section | FIG. 16U |
| 5.3.1 | Description | FIG. 16U |
| 5.3.2 | Structure | FIG. 16U |
| 5.3.3 | Tags | FIG. 16U |
| 5.4 | Text Items definition section | FIG. 16V |
| 5.4.1 | Description | FIG. 16V |
| 5.4.2 | Structure | FIG. 16V |
| 5.4.3 | Tags | FIG. 16V |
| 5.5 | Edit boxes definition section | FIG. 16V |
| 5.5.1 | Description | FIG. 16V |
| 5.5.2 | Structure | FIG. 16V |
| 5.5.3 | Tags | FIG. 16W |
| 5.6 | Choice items definition section | FIG. 16W |
| 5.6.1 | Description | FIG. 16W |
| 5.6.2 | Structure | FIG. 16W |
| 5.6.3 | Tags | FIG. 16X |
| 5.7 | Messageboxes definition section | FIG. 16X |
| 5.7.1 | Description | FIG. 16X |
| 5.7.2 | Structure | FIG. 16X |
| 5.7.3 | Tags | FIG. 16X |
| 5.8 | Images definition section | FIG. 16Y |
| 5.8.1 | Description | FIG. 16Y |
| 5.8.2 | Structure | FIG. 16Y |
| 5.8.3 | Tags | FIG. 16Y |
| 5.9 | Listboxes definition section | FIG. 16Y |
| 5.9.1 | Description | FIG. 16Y |
| 5.9.2 | Structure | FIG. 16Y |
| 5.9.3 | Tags | FIG. 16Y |
| 5.10 | Checkboxes definition section | FIG. 16Z |
| 5.10.1 | Description | FIG. 16Z |
| 5.10.2 | Structure | FIG. 16Z |
| 5.10.3 | Tags | FIG. 16Z |
| 5.11 | Example of screen usage | FIG. 16Z |
| 6 | System-level interactions | FIG. 16CC |
| 6.1 | General | FIG. 16CC |
| 6.1.1 | Description | FIG. 16CC |
| 6.1.2 | Structure | FIG. 16CC |
| 6.1.3 | Tags | FIG. 16CC |
| 6.2 | Device Registration & deregistration package | FIG. 16DD |
| 6.2.1 | Description | FIG. 16DD |
| 6.2.2 | Structure | FIG. 16DD |
| 6.2.3 | Tags | FIG. 16DD |
| 6.2.4 | Example | FIG. 16EE |
| 6.3 | Registration confirmation package | FIG. 16FF |

FIG. 16C

| | | |
|---|---|---|
| 6.3.1 | Description | FIG. 16FF |
| 6.3.2 | Structure | FIG. 16FF |
| 6.3.3 | Tags | FIG. 16FF |
| 6.3.4 | Example | FIG. 16GG |
| 6.4 | Setting the active device package | FIG. 16GG |
| 6.4.1 | Description | FIG. 16GG |
| 6.4.2 | Structure | FIG. 16GG |
| 6.4.3 | Tags | FIG. 16GG |
| 6.4.4 | Example | FIG. 16GG |
| 6.5 | Set active device response | FIG. 16HH |
| 6.5.1 | Description | FIG. 16HH |
| 6.5.2 | Structure | FIG. 16HH |
| 6.5.3 | Tags | FIG. 16HH |
| 6.5.4 | Example | FIG. 16HH |
| 6.6 | Set active platform package | FIG. 16HH |
| 6.6.1 | Description | FIG. 16HH |
| 6.6.2 | Structure | FIG. 16HH |
| 6.6.3 | Tags | FIG. 16II |
| 6.6.4 | Example | FIG. 16II |
| 6.7 | Set active platform response package | FIG. 16II |
| 6.7.1 | Description | FIG. 16II |
| 6.7.2 | Structure | FIG. 16II |
| 6.7.3 | Tags | FIG. 16JJ |
| 6.7.4 | Example | FIG. 16JJ |

FIG. 16D

1 Introduction

1.1 Purpose of document

This document describes the structure and syntax of the ARML language.

1.2 Audience

The document is intended to be read by AIRIX developers and users of ARML.

1.3 Definitions & Acronyms

ARML          AIRIX Markup Language
XML           Extensible Markup Language

FIG. 16E

2 ARML Overview

ARML is an XML markup language used by the AIRIX platform. It performs three tasks;

- Data is passed back and forth between the mobile server, AIRIX platform and enterprise application using ARML.
- The AIRIX Virtual machine uses ARML to define the user interface for an AIRIX-enabled application on the mobile device
- The AIRIX server uses ARML to define that data that it stores for the application in its database.

2.1 ARML design considerations

ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

FIG. 16F

2.2 ARML usage

The diagram below illustrates how ARML is used.

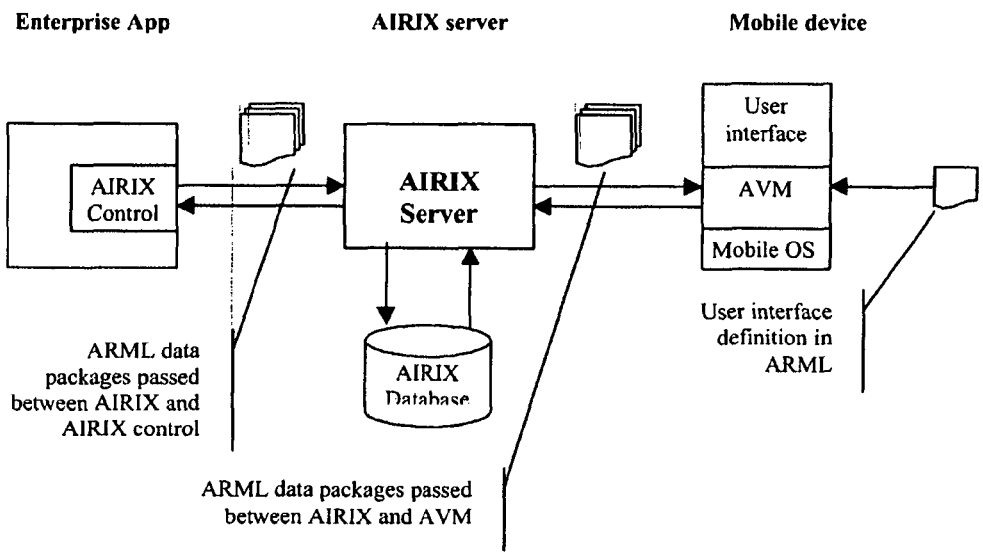

Figure 1 -The ARML environment

The key to ARML usage is the application definition file held on the AIRIX server. This file defines the AIRIX tables for the application, the allowed message set and the user interface definitions for the application on a given device.

2.3 The ARML prolog

As ARML is XML, all ARML documents must start with a prolog containing an XML declaration and a document type declaration, that precedes the actual ARML. The following prolog is appropriate;

```
<?xml version="1.0"?>
<!DOCTYPE ARML PUBLIC "-//NEXTAIR//DTD ARML 1.0//EN"
"http://www.nextair.com/DTD/ARML_1.0.xml">
```

2.4 The scratchpad area

Sometimes information needs to be passed from one screen to the next. This is achieved by the scratchpad, a temporary storage area where screens can store the values of field for use later on.

FIG. 16G

3 ARML application definition

3.1 General

3.1.1 Description
The application definition section defines the AIRIX tables and ARML data packages that are used for transactions involved with a specific application.

3.1.2 Structure
The ARML application definition has the following structure;

```
<ARML>
        <AXSCHDEF>
                <AXTDEFS>
                        (table definitions)
                </AXTDEFS>
                <DPACKETS>
                        (data package definitions)
                </DPACKETS>
                <DEVICES>
                        (device interface definitions)
                </DEVICES>
        </AXSCHDEF>
</ARML>
```

3.1.3 Tags

3.1.3.1 The <AXSCHDEF> tag
These tags (<AXSCHDEF>...</AXSCHDEF>) mark the start and end of the application definition. THE AXSCHDEF tag has two attributes;

| Attribute | Optional? | Description |
|---|---|---|
| APPNAME | No | The name of the application |
| VERSION | No | Which version of the application the file describes |

3.1.3.2 The <AXTDEFS> tag
The <AXTDEFS>...</AXTDEFS> pair marks the start and end of the table definitions section. It has no attributes.

3.1.3.3 The <DPACKETS> tag
The <DPACKETS>...</DPACKETS> pair marks the start and end of the data package definitions section. It has no attributes.

3.1.3.4 The <DEVICES> tag
The <DEVICES>...</DEVICES> pair marks the start and end of the device interface definitions section. It has no attributes.

FIG. 16H

3.2 Table Definitions Section

3.2.1 Description

The table definitions section defines the tables on the AIRIX server for the application

3.2.2 Structure

The table definitions section has the following structure;

```
{wrapper tags}
<TDEF>
      <FIELDS>
            <FLD>...</FLD>
      <FIELDS>
</TDEF>
 (etc.)
{wrapper tags}
```

3.2.3 Tags

3.2.3.1 The <TDEF> tag

Each table definition is enclosed within the <TDEF>...</TDEF> pair. The TDEF tag has the following attributes;

| Attribute | Optional? | Description |
| --- | --- | --- |
| NAME | No | The number of table definitions in the section |
| UPDATETYPE | No | Permitted values are:<br>NEW – |
| PK | No | Which of the table fields is the primary key for the table |

3.2.3.2 The <FIELDS> tag

The <FIELDS>...</FIELDS> tag pair marks where the fields in a given table are defined. The FIELDS tag has a no attributes.

3.2.3.3 The <FLD> tag

The <FLD>...</FLD> tag pair defines a single field in a table. Enclosed between the tags is the field name. The <FLD> tag has the following structure;

| Attribute | Optional? | Description |
| --- | --- | --- |
| TYPE | No | The data type contained in the field. Permitted values are:<br>INT – integer value<br>STRING – a fixed-length string of n characters (see SIZE field)<br>MEMO – a string of max 65535 characters |
| SIZE | No | If the TYPE is set to STRING, this field specifies the number of characters in the field |
| INDEXED | No | Specifies if the field needs to be indexed in the AIRIX database |
| REFERENCEFIELD | Yes | |
| ALLOWNULL | No | Specifies if the field is allowed to have a null value |

FIG. 16I

3.2.4 Example
An email application would use 2 tables for storing sent emails.

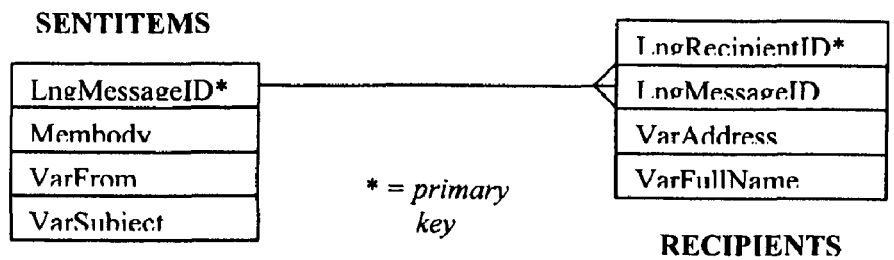

Figure 2 - sample email schema

This translates into the following ARML fragment;

```
<TDEF NAME="SENTITEMS" UPDATETYPE=NEW PK=LNGMESSAGEID>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID>
    <FIELDS>
        <FLD TYPE="INT" SIZE="AUTOINC" INDEXED="NO" REFERENCEFIELD=""
            ALLOWNULL="NO">LNGMESSAGEID</FLD>
        <FLD TYPE="INT" SIZE="0" INDEXED="YES"
            REFERENCEFIELD="SENTITEMS (MESSAGEID) "
            ALLOWNULL="NO">LNGMESSAGEID</FLD>
        <FLD TYPE="STRING" SIZE="200" INDEXED="NO" REFERENCEFIELD=""
            ALLOWNULL="YES">VARFULLNAME</FLD>
        <FLD TYPE="STRING" SIZE="200" INDEXED="NO" REFERENCEFIELD=""
            ALLOWNULL="YES">VARADDRESS</FLD>
    </FIELDS>
</TDEF>
```

Figure 3 - a sample table definition section

FIG. 16J

3.3 Package Definitions Section

3.3.1 Description

The package definitions section defines the structure of the application packages and the data that they carry.

3.3.2 Structure

The package definitions section has the following structure;

```
(wrapper tags)
<AXDATAPACKET>
    <TABLEUPDATES>
        <TUPDATE>
            <FIELDS>
                <FLD>...</FLD>
                <FLD>...</FLD>
            <FIELDS>
        </TUPDATE>
    </TABLEUPDATES>
    <TABLEUPDATES>
        <TUPDATE>
            <FIELDS>
                <FLD>...</FLD>
                <FLD>...</FLD>
                (etc.)
            <FIELDS>
        </TUPDATE>
    </TABLEUPDATES>
    (etc.)
</AXDATAPACKET>
(wrapper tags)
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| SENDTOMOBILE | No | Specifies whether the package is sent to the mobile device |
| SENDTOAPP | No | Specifies whether the package is sent to the application server |

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

| Attribute | Optional? | Description |
|---|---|---|

FIG. 16K

| TABLE | No | The table in the database that is updated |
|---|---|---|
| UPDATETYPE | No | |
| WHEREFIELD | Yes | |
| WHEREPARAM | Yes | |
| WHERETYPE | No | |
| SECTION | No | |
| MULTIROW | No | |
| MULTIROWINDENT | Yes | |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user interface field |
| PARAMTYPE | No | This defines the type of parameter. It can take two values;<br>PROP – this means that the parameter appears as part of the tag definition<br>VALUE – this means that the parameter is contained between the two tags. Only one parameter in a given data package can be of this type |

FIG. 16L

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD=""
        WHEREPARAM=""
            WHERETYPE="PROP" SECTION="MAIL" MULTIROW="NO" MULTIROWIDENT="">
            <FIELDS>
                <PKGFLD NAME="LNGMESSAGEID" PARAMTYPE="PROP">MSGID</PKGFLD>
                <PKGFLD NAME="VARFROM" PARAMTYPE="PROP">FROM</PKGFLD>
                <PKGFLD NAME="VARSUBJECT" PARAMTYPE="PROP">SUBJECT</PKGFLD>
                <PKGFLD NAME="MEMBODY" PARAMTYPE="VALUE">DATA</PKGFLD>
            </FIELDS>
        </TUPDATE>
        <TUPDATE TABLE="RECIPIENTS" UPDATETYPE="ADD" WHEREFIELD=""
        WHEREPARAM=""
            WHERETYPE="PROP" SECTION="RECIPS" MULTIROW="YES"
            MULTIROWIDENT="RCP">
            <FIELDS>
                <PKGFLD NAME="LNGMESSAGEID" PARAMTYPE="PROP">MSGID</PKGFLD>
                <PKGFLD NAME="VARFULLNAME" PARAMTYPE="PROP">TO</PKGFLD>
                <PKGFLD NAME="VARADDRESS" PARAMTYPE="PROP">ADDRESS</PKGFLD>
            </FIELDS>
        </TUPDATE>
    </TABLEUPDATES>
</AXDATAPACKET>
```

Figure 4 - a sample package definition

FIG. 16M

3.4 Device Interface Definitions Section

3.4.1 Description
The display definitions section contains the user interface definitions for the various mobile devices that an application supports.

3.4.2 Structure
The device display definitions section has the following structure;

```
(wrapper tags)
<DEV>
        <SCREENS>
                <SCRN>

</SCRN>
        </SCREENS>
</DEV>
(other devices)
(wrapper tags)
```

3.4.3 Tags

3.4.3.1 The <DEV> tag
The <DEV>...</DEV> pair delimits an interface definition for a specific device. The tag has the following attributes;

| Attribute | Optional? | Description |
|---|---|---|
| TYPE | No | The type of device. Allowed values are: |

3.4.3.2 The <SCREENS> tag
The <SCREENS>...</SCREENS> pair delimits the screens definition for a specific device. The tag has the following attribute;

| Attribute | Optional? | Description |
|---|---|---|
| LANGUAGE | No | The language that the screens grouping is in. This uses the IETF language identifiers as defined in RFC 1766. |

3.4.3.3 The <SCRN> tag
The <SCRN>...</SCRN> pair delimits a screen definition. The tag pair contains the name of the file with the screen definition. The tag has the following attributes;

| Attribute | Optional? | Description |
|---|---|---|
| NAME | No | An internal identifier for the screen |

FIG. 16N

3.4.4 Example
The following example shows the screen definitions section for an application that allows a user to view their inbox and the mails in it.

```
{wrapper tags}
<DEV TYPE="RIM">
      <SCREENS LANGUAGE="EN">
            <SCRN NAME="INBOX.screen"></SCRN>
            <SCRN NAME="VIEWNEWMAIL.screen"></SCRN>
      </SCREENS>
</DEV>
<DEV TYPE="PALM">
      <SCREENS LANGUAGE="EN">
            <SCRN NAME="INBOX.screen"></SCRN>
            <SCRN NAME="VIEWNEWMAIL.screen"></SCRN>
      </SCREENS>
</DEV>
{wrapper tags}
```

FIG. 16O

4 Application-defined packages

This section describes the format of application defined packages.

4.1 General

This section describes the general structure of an application-specific data package.
As described in section , ;

4.1.1 Description

System level packages are sent between AIRIX and the application server, and between AIRIX and the AVM

4.1.2 Structure

An application defined package has the following structure;

```
<ARML>
      <HEAD>
            (header information)
      </HEAD>
      <PKG>
            (package information)
      </PKG>
</ARML>
```

4.1.3 Tags

4.1.3.1 The <HEAD> tag

The <HEAD> tag is as described in section 6.1.3.1

4.1.3.2 The <PKG> tag

The <PKG>...</PKG> tags delimit the package data. The PKG tag has the following attributes;

| Attribute | Optional? | Description |
| --- | --- | --- |
| TYPE | No | A text string identifying the type of package being sent |

FIG. 16P

4.2 Package information

The format and rules for application-defined data packages depend on the package definitions for that application.

4.2.1 Example

A sample data package following the rules in section 3.3.4 would have a body section like this;

```
(wrapper tags)
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
(wrapper tags)
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" SENDTOMOBILE="NO" SENDTOAPP="YES">
```
Package
```
<BODY TYPE="ME">
```

The package has two sections, which correspond to the two table update sections in the package definition;

FIG. 16Q

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
        Package <MAIL MSGID="1" FROM="Tim Neil"

<RECIPS>
    <RCP>
    <RCP>
    <RCP>
</RECIPS>
```

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition
```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
    Package
<RCP MSGID="1" TO="Jeff Jones" ADDRESS="jeff@nextair.com"></RCP>
```

FIG. 16R

5 Screen Definitions

5.1 General

5.1.1 Description
A screen definition file defines a single screen for a specific device.

5.1.2 Structure
A screen definition file has the following structure;

```
<ARML>
    <SCREEN>
        <MENU>
            (menu definition)
        </MENU>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <MESSAGEBOXES>
            (message box definitions)
        </MESSAGEBOXES>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
    </SCREEN>
</ARML>
```

5.1.3 Tags

5.1.3.1 The SCREEN tag
The <SCREEN>...</SCREEN> pair marks the start and end of the screen definitions section. It has attribute –

| Attribute | Optional? | Description |
|---|---|---|
| NAME | No | An identifier for the screen. This is used to qualify variables and navigate between screens |
| TITLE | No | The title that appears for the screen. |
| BACKGROUND | Yes | If used, an image that appears behind the interface elements |

FIG. 16S

5.1.3.2 The BUTTONS tag
The <BUTTONS>...</BUTTONS> pair marks the start and end of the screen definitions section. It has no attributes.

5.1.3.3 The TEXTITEMS tag
The <TEXTITEMS>...</TEXTITEMS> pair marks the start and end of the text items section. It has no attributes.

5.1.3.4 The EDITBOXES tag
The <EDITBOXES>...</EDITBOXES> pair marks the start and end of the editboxes section. It has no attributes.

5.1.3.5 The CHOICEITEMS tag
The <CHOICEITEMS>...</CHOICEITEMS> pair marks the start and end of the images section. It has no attributes.

5.1.3.6 The MESSAGEBOXES tag
The <MESSAGEBOXES>...</MESSAGEBOXES> pair marks the start and end of the checkboxes section. It has no attributes.

5.1.3.7 The IMAGES tag
The <IMAGES>...</IMAGES> pair marks the start and end of the images section. It has no attributes.

5.1.3.8 The CHECKBOXES tag
The <CHECKBOXES>...</CHECKBOXES> pair marks the start and end of the checkboxes section. It has no attributes.

5.1.3.9 The LISTBOXES tag
The <LISTBOXES>...</LISTBOXES> pair marks the start and end of the listboxes section. It has no attributes.

5.2 Menu definition section
5.2.1 Description
The menu definition section describes the menu for a given screen.

5.2.2 Structure
The menu definition section has the following structure;

```
{wrapper tags}
<MENU>
        <MENUITEM>
                <EVENTS>
                        <ACTION>...</ACTION>
                </EVENTS>
        </MENUITEM>
</MENU>
```

FIG. 16T

```
{wrapper tags}
```

5.2.3 Tags

5.2.3.1 The EVENTS tag
The <EVENTS>...</EVENTS> pair marks the start and end of the events section. It has no attributes.

5.2.3.2 The ACTION tag
The <ACTION>...</ACTION> pair marks the start and end of an event definition. It has attribute –

| Attribute | Optional? | Description |
|---|---|---|
| EVENTTYPE | | The type of action that should be performed when the button is pushed. Allowed values are; <br> OPEN – tells the AVM to open the screen with the name given <br> ARML – tells the AVM to compose & send an ARML package to the server using info derived from fields on the screen <br> SAVE – tells the AVM to cache all fields that are marked as needed to be saved in the scratchpad area |

5.3 Buttons definition section
5.3.1 Description
The buttons definition section describes the buttons that appear on a given screen.

5.3.2 Structure
The buttons definition section has the following structure;

```
{wrapper tags}
<BTN>
    <EVENTS>
        <ACTION>...</ACTION>
    </EVENTS>
</BTN>
{wrapper tags}
```

5.3.3 Tags

5.3.3.1 The BTN tag
The <BTN>...</BTN> pair marks the start and end of a button definition. It has one attribute –

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be |

FIG. 16U

|  |  | skipped without processing by the parser |
|---|---|---|

5.3.3.2 The EVENTS tag
The events tag is as in section 5.2.3.1

5.3.3.3 The ACTION tag
The action tag is as in section 5.2.3.2

5.4 Text Items definition section
5.4.1 Description
The text items definition

5.4.2 Structure
The text items section has the following structure;

```
{wrapper tags}
<TI>
      <EVENTS>
            <ACTION>...</ACTION>
      </EVENTS>
</TI>
{wrapper tags}
```

5.4.3 Tags

5.4.3.1 The TI tag
The <TI>...</TI> pair marks the start and end of the screen definitions section. It has attribute –

| Attribute | Optional? | Description |
|---|---|---|
| INDEX | No | The order in which the text item appears |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |

5.5 Edit boxes definition section
5.5.1 Description

5.5.2 Structure
The edit boxes section has the following structure;

```
{wrapper tags}
<EB>
      <EVENTS>
            <ACTION>...</ACTION>
      </EVENTS>
</EB>
{wrapper tags}
```

FIG. 16V

5.5.3 Tags

5.5.3.1 The EB tag

The <EB>...</EB> pair marks an edit box definition. It has the following attributes –

| Attribute | Optional? | Description |
| --- | --- | --- |
| NAME | No | An identifier for the edit box. |
| INDEX | No | The order in which the edit box appears |
| CAPTION | No | The caption for on a given edit box |
| MULTILINE | No | Boolean field that indicates whether the edit box is a multiline field. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| DATASRC | Yes | If present, the package and field in the package that populates this edit box. This is given in the format "package.field". |

5.5.3.2 The EVENTS tag

The events tag is as described in section 5.2.3.1

5.5.3.3 The ACTION tag

The action tag is as described in section 5.2.3.2

5.6 Choice items definition section

5.6.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.6.2 Structure

The choice items section has the following structure;

```
{wrapper tags}
<CHOICE>
        <EVENTS>
                <ACTION>...</ACTION>
        </EVENTS>
</CHOICE>
{wrapper tags}
```

FIG. 16W

5.6.3 Tags

5.6.3.1 The <CHOICE> tag

The <CHOICE>...</CHOICE> pair marks the start and end of a choice item definition. It has these attributes –

| Attribute | Optional? | Description |
| --- | --- | --- |
| NAME | No | An identifier for the choice item. |
| INDEX | No | The order in which the choice item appears |
| CAPTION | No | The caption that appears for a given choice item |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the package and field in the package that populates this choice item. This is given in the format "package.field". |

5.7 Messageboxes definition section

5.7.1 Description

The messageboxes section describes the messageboxes that could appear due to user action.

5.7.2 Structure

The messageboxes section has the following structure;

```
(wrapper tags)
<MB>
    <EVENTS>
        <ACTION>...</ACTION>
    </EVENTS>
</MB>
(wrapper tags)
```

5.7.3 Tags

5.7.3.1 The MB tag

The <MB>...</MB> pair marks a message box definition

| Attribute | Optional? | Description |
| --- | --- | --- |
| CAPTION | Yes | The caption to display in the title bar of the message box |
| TEXT | Yes | The text to display in the message box |
| TYPE | No | The type of message box to display |

FIG. 16X

5.8 Images definition section

5.8.1 Description
The images section describes.

5.8.2 Structure
The messageboxes section has the following structure;

```
{wrapper tags}
    <IMG>...</IMG>
{wrapper tags}
```

5.8.3 Tags

5.8.3.1 The IMG tag
The <IMG>...</IMG> pair describes an image that appears on a given screen.

| Attribute | Optional? | Description |
| --- | --- | --- |
| NAME | No | An identifier for the image. |
| FILE | No | The filename of the image. |
| X | Yes | The X-coordinate of the image on the screen. This attribute may not be meaningful in some display environments, in which case it would be skipped without processing by the parser |
| Y | Yes | The Y-coordinate of the image on the screen. This attribute may not be meaningful in some display environments, in which case it would be skipped without processing by the parser |

5.9 Listboxes definition section

5.9.1 Description
The listboxes section describes a list box that appears on a given screen.

5.9.2 Structure
The listboxes section has the following structure;

```
{wrapper tags}
    <LB>...</LB>
{wrapper tags}
```

5.9.3 Tags

5.9.3.1 The LB tag
The <LB>...</LB> pair marks a list box definition

| Attribute | Optional? | Description |
| --- | --- | --- |
| NAME | No | An identifier for the list box. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| X | Yes | The X-coordinate of the list box on the screen. This attribute may not be |

FIG. 16Y

| | | |
|---|---|---|
| | | meaningful in some display environments, in which case it would be skipped without processing by the parser |
| Y | Yes | The Y-coordinate of the list box on the screen. This attribute may not be meaningful in some display environments, in which case it would be skipped without processing by the parser |
| DATASRC | Yes | If present, the package and field in the package that populates this list box. This is given in the format "package.field". |

5.10 Checkboxes definition section

5.10.1 Description
The checkboxes section describes a check box that appears on a given screen.

5.10.2 Structure
The checkboxes section has the following structure;

```
{wrapper tags}
    <CHK>...</CHK>
{wrapper tags}
```

5.10.3 Tags

5.10.3.1 The CHK tag
The <CHK>...</CHK> pair marks a check box definition

| Attribute | Optional? | Description |
|---|---|---|
| NAME | No | An identifier for the check box. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| DATASRC | Yes | If present, the package and field in the package that populates this check box. This is given in the format "package.field". |

5.11 Example of screen usage

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
    <SCREEN NAME="NewMsg">
        <BUTTONS>
            <BTN NAME="OK" CAPTION="Send" INDEX="0">
```

FIG. 16Z

```
            <EVENTS>
                <ACTION TYPE="ARML">
                    <ARMLTEXT>
                        <BODY TYPE="ME">
                            <ME MSGID="1" FROM="Tim Neil"
                                SUBJECT="[NewMsg.Subject]">
                                <DATA>[NewMsg.Body]</DATA>
                                <RECIPS>
                                    <RCP MSGID="1" TO="[NewMsg.To]"></RCP>
                                </RECIPS>
                            </ME>
                        </BODY>
                    </ARMLTEXT>
                </ACTION>
            </EVENTS>
        </BTN>
    </BUTTONS>
    <EDITBOXES>
        <EB NAME="To" INDEX="1"></EB>
        <EB NAME="Subject" INDEX="2"></EB>
        <EB NAME="Body" INDEX="3"></EB>
    </EDITBOXES>
</SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENTS>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[NewMsg.Subject]">
        <DATA>[NewMsg.Body]</DATA>
        <RECIPS>
            <RCP MSGID="1" TO="[NewMsg.To]"></RCP>
        </RECIPS>
    </ME>
</BODY>
```

FIG. 16AA

The subject field is taken from the edit box named 'Subject';

```
<ME MSGID="1" FROM="Tim Neil" SUBJECT="[NewMsg.Subject]">
```

The recipients field is taken from the edit box named 'Subject';

```
<RECIPS>
    <RCP MSGID="1" TO="[NewMsg.To]"></RCP>
</RECIPS>
```

Finally the text of the message is filled from the 'Body' field;

```
<DATA>[NewMsg.Body]</DATA>
```

FIG. 16BB

6 System-level interactions

This section describes the primitives that are used for system-level interactions with the AIRIX server.

6.1 General

6.1.1 Description

System level packages are sent between AIRIX and the application server, and between AIRIX and the AVM

6.1.2 Structure

System interactions are performed by exchanging ARML data packages with the following structure;

```
<ARML>
<HEAD>...</HEAD>
<SYS>
(data)
</SYS>
</ARML>
```

6.1.3 Tags

6.1.3.1 The <HEAD> tag

The package header is delimited by the <HEAD>...</HEAD> tags. Contained in text between the two tags is the id of the destination mobile. The HEAD tag has the following attributes;

| Attribute | Optional? | Description |
| --- | --- | --- |
| DT | No | The date & time in RFC 1123 format |
| ID | No | A unique ID for the message |
| VERSION | No | The version number of the application |
| APPNAME | No | The application name |
| DEVICE | No | A numeric constant identifying the device |

6.1.3.2 The <SYS> tag

The <SYS>...</SYS> pair contains the actual system package. The tag does not have any attributes.

FIG. 16CC

6.2 Device Registration & deregistration package

6.2.1 Description

Device registration packages are sent from the AIRIX component to the AIRIX server when a user changes their registration status.

6.2.2 Structure

A device registration package has the following structure;

```
{wrapper tags}
<REG>
       <CLIENTID> {data} </CLIENTID>
       <MOBILEID> {data} </MOBILEID>
       <NEWMOBILEID> {data} </NEWMOBILEID>
       <PLATFORMS>
              <PLATFORM> {data} </PLATFORM>
       </PLATFORMS>
</REG>
{wrapper tags}
```

6.2.3 Tags

6.2.3.1 The <REG> tag

The <REG>...</REG> pair delimit the registration request. The tag has the following attributes;

| Attribute | Optional? | Description |
| --- | --- | --- |
| TYPE | No | This defines the type of parameter. It can take two values;<br>ADD – this means that the device is to be added to the registration database<br>UPDATE – this means that the setting is being modified for the device<br>DELETE – this means that the device is to be removed to the registration database |
| UPDATEPLATFORM | No | This field indicates whether the server will be updated. Allowable values are YES or NO |

6.2.3.2 The <CLIENTID> tag

The <CLIENTID>...</CLIENTID> pair contain the clientID. The tag does not have any attributes.

6.2.3.3 The <MOBILEID> tag

The <MOBILEID>...</MOBILEID> pair contain the mobile ID. The tag does not have any attributes.

6.2.3.4 The <NEWMOBILEID> tag

The <MOBILEID>...</MOBILEID> pair contain the new mobileID. The tag does not have any attributes.

FIG. 16DD

6.2.3.5 The <PLATFORMS> tag

The <PLATFORMS>...</PLATFORMS> pair contain one or more PLATFORM declarations. The tag does not have any attributes.

6.2.3.6 The <PLATFORM> tag

The <PLATFORM>...</PLATFORM> pair contain the address to use for the platform. The tag has the following attributes;

| Attribute | Optional? | Description |
|---|---|---|
| ID | No | The ID of the platform |

6.2.4 Example

This package would be sent by a user, whose and who was going to use the RIM platform, to register;

```
{wrapper tags}
<REG TYPE="ADD">
        <CLIENTID>SUNTRESS</CLIENTID>
        <MOBILEID>867452</MOBILEID>
        <NEWMOBILEID>268625</NEWMOBILEID>
        <PLATFORMS>
                <PLATFORM>RIM</PLATFORM>
        </PLATFORMS>
</REG>
{wrapper tags}
```

FIG. 16EE

6.3 Registration confirmation package

6.3.1 Description
This packages is sent back from the AIRIX server to the AVM to confirm that the device has been registered.

6.3.2 Structure
A registration confirmation package has the following structure;

```
(wrapper tags)
<REGCONFIRM>
      <MOBILEID> (data) </MOBILEID>
      <VALUE> (data) </VALUE>
      <INTERFACE>
      (interface description)
      </INTERFACE>
</REGCONFIRM>
(wrapper tags)
```

6.3.3 Tags

6.3.3.1 The <REGCONFIRM> tag
The <REGCONFIRM>...</REGCONFIRM> pair delimit the confirmation. The tag has the following attributes;

| Attribute | Optional? | Description |
| --- | --- | --- |
| TYPE | No | This defines the type of parameter. It can take two values;<br>ADD – this means that the device is to be added to the registration database<br>UPDATE – this means that the setting is being modified for the device<br>DELETE – this means that the device is to be removed to the registration database |

6.3.3.2 The <MOBILEID> tag
The <MOBILEID>...</MOBILEID> pair contains the mobile ID. The tag does not have any attributes.

6.3.3.3 The <VALUE> tag
The <VALUE>...</VALUE> pair contains the status of the registration request. The following text strings are allowable;

CONFIRM – this means that the registration request was successful
EXCEEDLIMIT – this means that the registration request failed because
NOTUNIQUE – this means that the registration request failed because
INVALIDCLIENT – this means that the registration request failed because
NODEVICE – this means that the registration request failed because

FIG. 16FF

6.3.3.4 The <INTERFACE> tag

The <INTERFACE>...</INTERFACE> pair contains the user interface for the application. Th specification of the interface is as described in section 5;

6.3.4 Example

This package would be sent to confirm the example request in section 6.2.4;

```
{wrapper tags}
<REGCONFIRM TYPE="ADD">
      <MOBILEID>268625</MOBILEID>
      <VALUE>CONFIRM</VALUE>
      <INTERFACE>
         <BUTTONS NUM="1">
            <BTN NAME="OK" CAPTION="Send" INDEX="0">
            </BTN>
         </BUTTONS>
         <EDITBOXES NUM="3">
            <EB NAME="To" INDEX="1"></EB>
            <EB NAME="Subject" INDEX="2"></EB>
            <EB NAME="Body" INDEX="3"></EB>
         </EDITBOXES>
      </INTERFACE>
</REGCONFIRM>
{wrapper tags}
```

6.4 Setting the active device package

6.4.1 Description

If a user wishes to set the current device as their active device, the AVM must send a 'set active device' package to the AIRIX server

6.4.2 Structure

A 'set active device' package has the following structure;

```
{wrapper tags}
<SA>
{data}
</SA>
{wrapper tags}
```

6.4.3 Tags

6.4.3.1 The <SA> tag

The 'set active device' package is shown by the <SA>...</SA> tags. The tag has no attributes; the tag pair contains the user's username

6.4.4 Example

This package would be sent by a user with the username of 'scotty';

```
{wrapper tags}
<SA>scotty</SA>
{wrapper tags}
```

FIG. 16GG

6.5 Set active device response

6.5.1 Description
This packages is sent back from the AIRIX server to the AVM in response to a request to set the current device as the active one.

6.5.2 Structure
A 'set active device response' package has the following structure;

```
{wrapper tags}
<SACONFIRM>
        <VALUE> {data} </VALUE>
</SACONFIRM>
{wrapper tags}
```

6.5.3 Tags

6.5.3.1 The <SACONFIRM> tag
The <SACONFIRM>...</SACONFIRM> pair delimit the confirmation. The tag does not have any attributes.

6.5.3.2 The <VALUE> tag
The <VALUE>...</VALUE> pair contains the status of the registration request. The following text strings are allowable;

CONFIRM – this means that the registration request was successful
NOTREGISTERED – this means that the registration request failed because

6.5.4 Example
This package would be sent by the AIRIX server to confirm a set active request;

```
{wrapper tags}
<SACONFIRM>
        <VALUE>CONFIRM</VALUE>
</SACONFIRM>
{wrapper tags}
```

6.6 Set active platform package

6.6.1 Description
'Set active platform' packages are sent from the application to the AIRIX server to indicate that a particular device should be used for that application

6.6.2 Structure
A device registration package has the following structure;

```
{wrapper tags}
<SETPLATFORM>
        <CLIENTID> {data} </CLIENTID>
        <MOBILEID> {data} </MOBILEID>
        <PLATFORM> {data} </PLATFORM>
</SETPLATFORM>
```

FIG. 16HH

```
{wrapper tags}
```

6.6.3 Tags

6.6.3.1 The <SETPLATFORM> tag

The <SETPLATFORM>...</SETPLATFORM> pair delimit the registration request. The tag does not have any attributes.

6.6.3.2 The <CLIENTID> tag

The <CLIENTID>...</CLIENTID> pair contain the clientID. The tag does not have any attributes.

6.6.3.3 The <MOBILEID> tag

The <MOBILEID>...</MOBILEID> pair contains the mobile ID. The tag does not have any attributes.

6.6.3.4 The <PLATFORM> tag

The <PLATFORM>...</PLATFORM> pair contains the new mobileID. The tag does not have any attributes.

6.6.4 Example

This package would be sent by a user with the username of 'scotty';

```
{wrapper tags}
<SETPLATFORM TYPE="UPDATE">
        <CLIENTID>DEREKC</CLIENTID>
        <MOBILEID>102030</MOBILEID>
        <PLATFORM>WINCE</PLATFORM>
</SETPLATFORM>
{wrapper tags}
```

6.7 Set active platform response package

6.7.1 Description

This packages is sent back from the AIRIX server to the AVM in response to a request to set the current device as the active one.

6.7.2 Structure

A 'set active device response' package has the following structure;

```
{wrapper tags}
<PLATFORMCONFIRM>
        <MOBILEID> (data) </MOBILEID>
        <VALUE> (data) </VALUE>
</PLATFORMCONFIRM>
{wrapper tags}
```

FIG. 16II

6.7.3 Tags

6.7.3.1 The <PLATFORMCONFIRM> tag

The <PLATFORMCONFIRM>...</PLATFORMCONFIRM> pair delimit the confirmation. The tag has the following attributes;

| Attribute | Optional? | Description |
|---|---|---|
| TYPE | No | This defines the type of parameter. It can take two values;<br>ADD – this means that the device is to be added to the registration database<br>UPDATE – this means that the setting is being modified for the device<br>DELETE – this means that the device is to be removed to the registration database |

6.7.3.2 The <MOBILEID> tag

The <MOBILEID>...</MOBILEID> pair contains the mobile ID. The tag does not have any attributes.

6.7.3.3 The <VALUE> tag

The <VALUE>...</VALUE> pair contains the status of the registration request. The following text strings are allowable;

CONFIRM – this means that the registration request was successful
NOTREGISTERED – this means that the registration request failed because
INVALIDCLIENT – this means that the registration request failed because
NODEVICE – this means that the registration request failed because
NETNOTREGISTERED – this means that the registration request failed because

6.7.4 Example

This package would be sent in response to the request in section 6.6.4 to indicate a failure;

```
{wrapper tags}
<PLATFORMCONFIRM TYPE="UPDATE">
        <MOBILEID>102030</MOBILEID>
        <VALUE>NOTREGISTERED</VALUE>
</PLATFORMCONFIRM>
{wrapper tags}
```

FIG. 16JJ

SOFTWARE, DEVICES AND METHODS FACILITATING EXECUTION OF SERVER-SIDE APPLICATIONS AT MOBILE DEVICES

CROSS-REFERENCE TO RELATED APPLICATIONS

This application is a continuation of application Ser. No. 09/846,781 filed May 2, 2001 now U.S. Pat. No. 7,546,298, which claims the benefit of U.S. provisional patent application No. 60/260,223 filed Jan. 9, 2001, the contents of both of which are hereby incorporated by reference.

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

FIELD OF THE INVENTION

The present invention relates to software, devices and methods allowing varied mobile devices to interact with server side software applications.

BACKGROUND OF THE INVENTION

Wireless connectivity is a feature of the modern telecommunications environment. An increasing range of people are using a wide variety of wireless data networks to access corporate data applications.

However, there are numerous competing mobile devices that can be used to achieve this. Each device has its own operating system and its own display characteristics. Operating systems are not mutually compatible, nor are the display characteristics—some are color, some are black and white, some are text-only, some are pictorial.

At the same time, an increasing number of mobile device users are people without a technical background or high level of educational achievement. Such people are often intimidated by the need to run complex installation programs. Furthermore, at present, such installation programs generally depend on cable connections to a personal computer by the means of a 'cradle' or other such device.

Therefore, a mechanism whereby a mobile client for a server side application may be enabled for multiple wireless devices with minimal modification of the application at the server is required. Further, the ability to install and upgrade the application onto mobile devices wirelessly without the need for human intervention or connection to PCs, is desirable.

SUMMARY OF THE INVENTION

In accordance with the present invention, data from an application executing at a computing device is presented at a remote wireless device, by providing the device an application definition file, containing definitions for a user interface format for the application at the wireless device; the format of network messages for exchange of data generated by the application; and a format for storing data related to the application at the wireless device. Using these definitions, the wireless device may receive data from said application in accordance with the definition and present an interface for the application.

Preferably, the application definition file is an XML file. Similarly, application specific network messages provided to the device are also formed using XML.

In the preferred embodiment, the data from the application is presented at the mobile device by virtual machine software that uses the application definition file.

In accordance with an aspect of the present invention, a method of presenting data from an application executing at a computing device at a remote wireless device, includes: receiving at the wireless device, a representation of a text file defining: a format of a user interface for the application at the wireless device; format of network messages for exchange of data generated by the application; a format for storing data related to the application at the wireless device. Thereafter, data from the application may be received in accordance with the format of network transactions, and presented at the wireless device using the user interface.

In accordance with another aspect of the present invention, a wireless mobile device includes a processor and computer readable memory in communication with the processor, storing virtual machine software controlling operation of the device. The virtual machine software includes a parser for receiving a text file; a screen generation engine, for presenting at least one screen at the device in accordance with the text file; an event handier for processing events arising in response to interaction with the at least one screen in accordance with the text file; and object classes corresponding to actions to be taken by the in response to interaction with the at least one screen.

Other aspects and features of the present invention will become apparent to those of ordinary skill in the art, upon review of the following description of specific embodiments of the invention in conjunction with the accompanying figures.

BRIEF DESCRIPTION OF THE DRAWINGS

In figures which illustrate, by way of example, embodiments of the present invention, FIG. 1 schematically illustrates a mobile device, exemplary of an embodiment of the present invention, including virtual machine software, further exemplary of an embodiment of the present invention;

FIG. 11 illustrates the format of messages exchanged in the message flow of FIG. 7;

FIG. 15C illustrates how locally stored data is updated by a sample message in accordance with the sample portion of an application file definition of FIG. 15A;

FIGS. 16A-16JJ contain Appendix "A" detailing example XML entities understood by the virtual machine software of the mobile device of FIG. 1.

DETAILED DESCRIPTION

Figure 1:
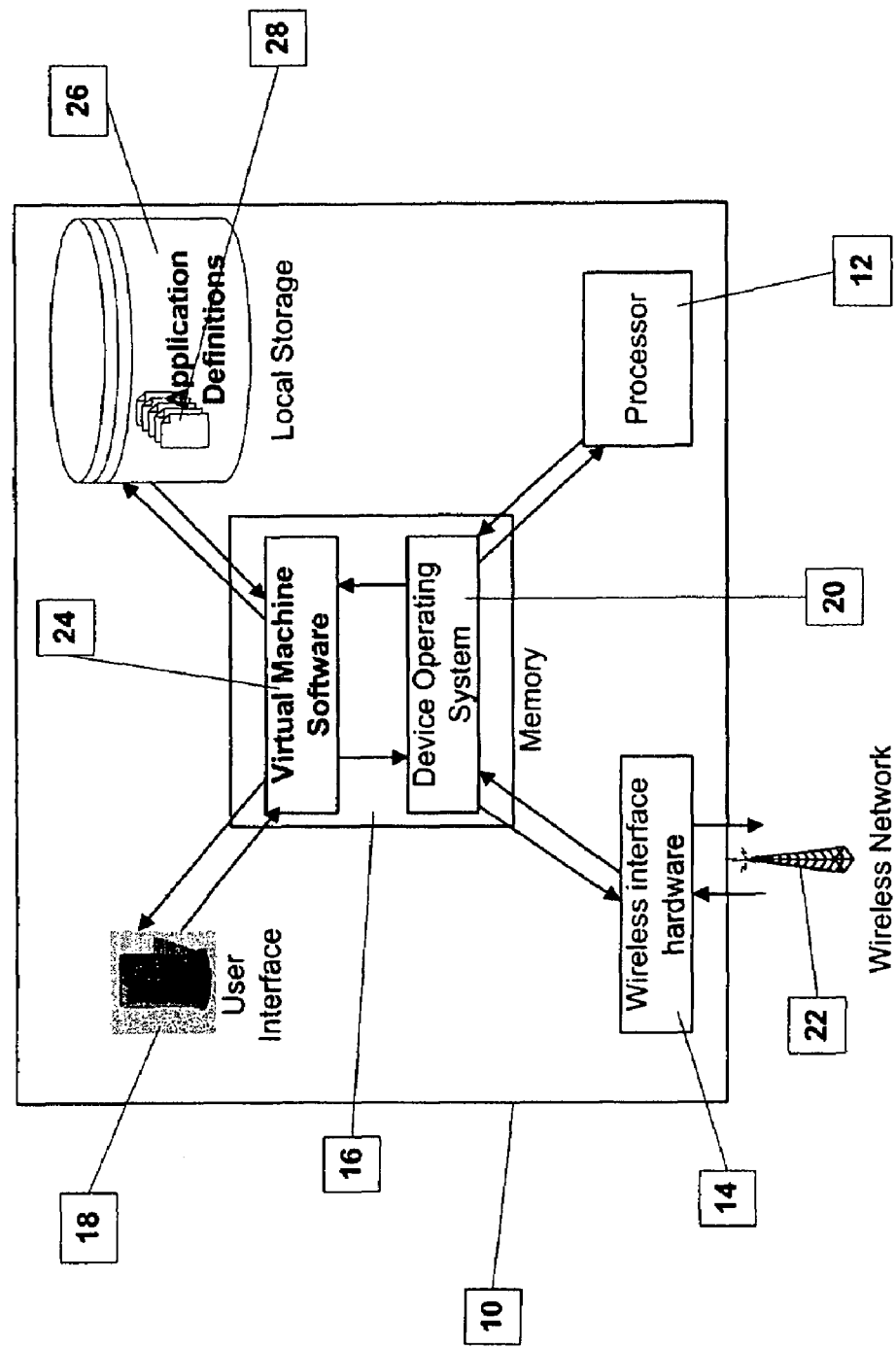

FIG. 1 illustrates a mobile device 10, exemplary of an embodiment of the present invention. Mobile device 10 may be any conventional mobile device, modified to function in manners exemplary of the present invention. As such, mobile device 10 includes a processor 12, in communication with a network interface 14, storage memory 16, and a user interface 18 typically including a keypad and/or touch-screen. Network interface 14 enables device 10 to transmit and receive data over a wireless network 22. Mobile device 10 may be, for example, be a Research in Motion (RIM) two-way paging device, a WinCE based device, a PalmOS device, a WAP enabled mobile telephone, or the like. Memory 16 of device 10 stores a mobile operating system such as the PalmOS, or WinCE operating system software 20. Operating system software 20 typically includes graphical user interface and network interface software having suitable application programmer interfaces ("API"s) for use by other applications executing at device 10.

Memory at device 10 further stores virtual machine software 24, exemplary of an embodiment of the present invention. Virtual machine software 24, when executed by mobile device 10 enables device 10 to present an interface for server side applications provided by a middleware server, described below. Specifically, virtual machine software 24 interprets a text application definition file defining a user interface 18 controlling application functionality, and the display format (including display flow) at device 10 for a particular server-side application; the format of data to be exchanged over the wireless network for the application; and the format of data to be stored locally at device 10 for the application. Virtual machine software 24 uses operating system 20 and associated APIs to interact with device 10, in accordance with the received application definition file. In this way, device 10 may present interfaces for a variety of applications, stored at a server. Moreover, multiple wireless devices each having a similar virtual machine software 24 may use a common server side application in combination with an application definition, to present a user interface and program flow specifically adapted for the device.

As such, and as will become apparent, the exemplary virtual machine software 24 is specifically adapted to work with the particular mobile device 10. Thus if device 10 is a RIM pager, virtual machine software 24 is a RIM virtual machine. Similarly, if device 10 is a PalmOS or WinCE device, virtual machine software 24 would be a PalmOS or a WinCE virtual machine. As further illustrated in FIG. 1, virtual machine software 24 is capable of accessing local storage 28 at device 10.

As detailed below, an exemplary application definition file may be formed using a markup language, like XML. In accordance with an embodiment of the present invention, defined XML entities are understood by the virtual machine software 24. Defined XML entities are detailed in Appendix "A", hereto. The defined XML entities are interpreted by the virtual machine software 24, and may be used as building blocks to present server-side applications at mobile device 10, as detailed herein.

Figure 2:
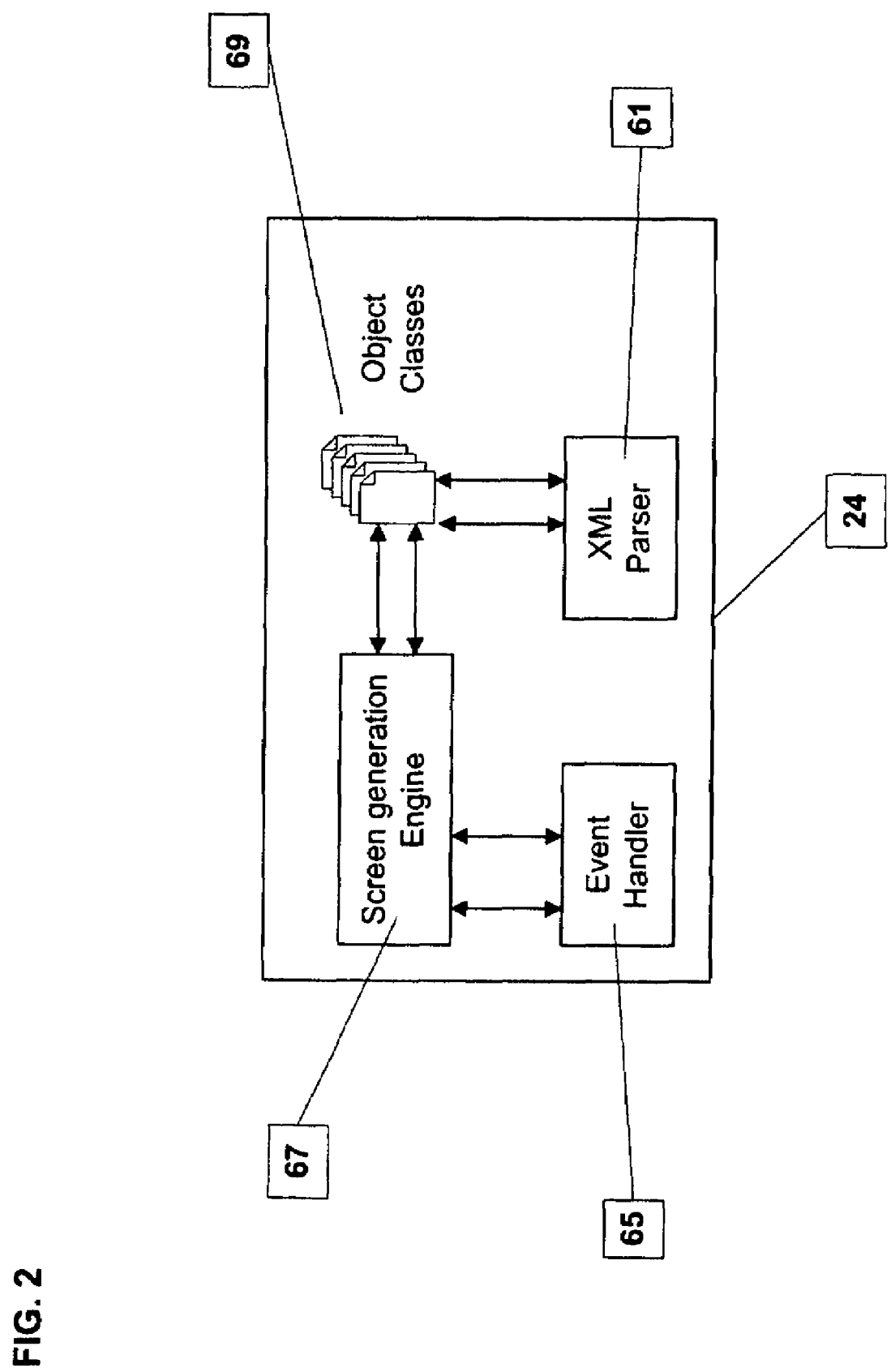
FIG. 2 further illustrates the organization of exemplary virtual machine software at the mobile device of FIG. 1.

Specifically, as illustrated in FIG. 2, virtual machine software 24 includes a conventional XML parser 61; an event handler 65; a screen generation engine 67; and object classes 69 corresponding to XML entities supported by the virtual machine software 24, and possibly contained within an application definition file. Supported XML entities are detailed in Appendix "A" hereto enclosed. A person of ordinary skill will readily appreciate that those XML entities identified in Appendix "A" are exemplary only, and may be extended, or shortened as desired.

XML parser 61 may be formed in accordance with the Document Object Model, or DOM, available at http://www.w3.org/DOM/, the contents of which are hereby incorporated by reference. Parser 61 enables virtual machine software 24 to read an application description file. Using the parser, the virtual machine software 24 may form a binary representation of the application definition file for storage at the mobile device, thereby eliminating the need to parse text each time an application is used. Parser 61 may convert each XML tag contained in the application definition file, and its associated data to tokens, for later processing. As will become apparent, this may avoid the need to repeatedly parse the text of an application description file.

Screen generation engine 67 displays initial and subsequent screens at the mobile device, in accordance with an application description file 28, as detailed below.

Event handler 65, of virtual machine software 24 allows device 10 under control of virtual machine software 24 to react to certain external events. Example events include user interaction with presented screens or display elements, incoming messages received from a wireless network, or the like.

Object classes 69 define objects that allow device 10 to process each of the supported XML entities at the mobile device. Each of object classes 69 includes attributes used to store parameters defined by the XML file, and functions allowing the XML entity to be processed at the mobile device, as detailed in Appendix "A", for each supported XML entity. So, as should be apparent, supported XML entities are extensible. Virtual machine software 24 may be expanded to support XML entities not detailed in Appendix "A". Corresponding object classes could be added to virtual machine software 24.

As detailed below, upon invocation of a particular application at mobile device 10, the virtual machine software 24 presents an initial screen based on the contents of the application definition file 28. Screen elements are created by screen generation engine 67 by creating instances of corresponding object classes for defined elements, as contained within object classes 69. The object instances are created using attributes contained in the application definition file 28. Thereafter the event handler 65 of the virtual machine software 24 reacts to events for the application. Again, the event handler consults the contents of the application definition file for the application in order to properly react to events. Events may be reacted to by creating instances of associated "action" objects, from object classes 69 of virtual machine software 24.

Similarly, object classes 69 of virtual machine software 24 further include object classes corresponding to data tables and network transactions defined in the Table Definition and Package Definition sections of Appendix "A". At run time, instances of object classes corresponding to these classes are created and populated with parameters contained within application definition file, as required.

Using this general description, persons of ordinary skill in the art will be able to form virtual machine software 24 for any particular device. Typically, virtual machine software 24 may be formed using conventional object oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a mobile device, using conventional techniques. It can be embedded in ROM, loaded into RAM over a network, or from a computer readable medium. Although, in the preferred embodiment the virtual machine software 24 is formed using object oriented structures, persons of ordinary skill will readily appreciate that other approaches could be used to form suitable virtual machine software. For example, the object classes forming part of the virtual machine could be replaced by equivalent functions, data structures or subroutines formed using a conventional (i.e. non-object oriented) programming environment. Operation of virtual machine software 24 under control of an application definition containing various XML definitions exemplified in Appendix "A", is further detailed below.

Figure 3:
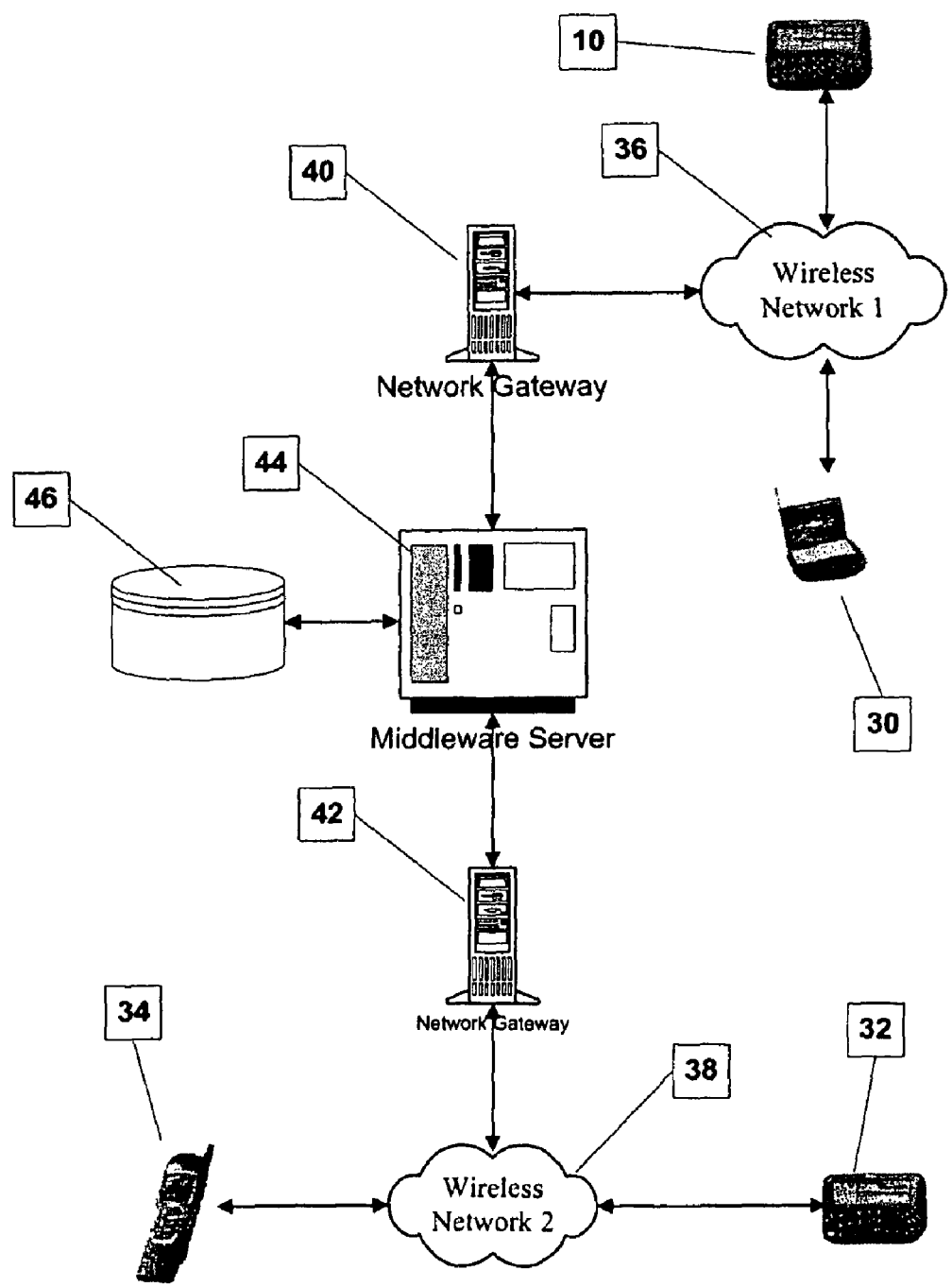
FIG. 3 illustrates an operating environment for the device of FIG. 1.

FIG. 3 illustrates the operating environment for a mobile device 10. Further example mobile devices 30, 32 and 34 are also illustrated in FIG. 3. These mobile devices 30, 32 and 34 are similar to device 10 and also store and execute virtual machine software exemplary of an embodiment of the present invention.

Virtual machine software like that stored at device 10, executes on each mobile device 10, 30, 32, 34, and communicates with a middleware server 44 by way of example wireless networks 36 and 38 and network gateways 40 and 42. Example gateways 40 and 42 are generally available as a service for those people wishing to have data access to wireless networks. An example network gateway is available from Broadbeam Corporation in association with the trademark SystemsGo!. Wireless networks 36 and 38 are further connected to one or more computer data networks, such as the Internet and/or private data networks by way of gateway 40 or 42. As will be appreciated, the invention may work with many types of wireless networks. Middleware server 44 is in turn in communication with a data network, that is in communication with wireless network 36 and 38. The communication used for such communication is via TCP/IP over an HTTP transport. As could be appreciated, other network protocols such as X.25 or SNA could equally be used for this purpose.

Devices 10, 30, 32, and 34 communicate with middleware server 44 in two ways. First, virtual machine software 24 at each device may query middleware server 44 for a list of applications that a user of an associated mobile device 10,30, 32 or 34 can make use of. If a user decides to use a particular application, device 10, 30, 32 or 34 can download a text description, in the form of an application definition file, for the application from the middleware server 44 over its wireless interface. As noted, the text description is preferably formatted using XML. Second, virtual machine software 24 may send, receive, present, and locally store data related to the execution of applications, or its own internal operations. The format of exchanged data for each application is defined by an associated application description file. Again, the exchanged data is formatted using XML, in accordance with the application description file.

Middleware server 44, in turn, stores text application description files for those applications that have been enabled to work with the various devices 10, 30, 32, and 34 using virtual machine software 24 in a pre-defined format understood by virtual machine software 24. Software providing the functions of the middleware server 44, in the exemplary embodiment is written in Delphi, using an SQL Server database.

As noted, text files defining application definitions and data may be formatted in XML. For example XML version 1.0, detailed in the XML version 1.0 specification second edition, dated 6 Oct. 2000 and available at the internet address "http://www.w3.org/TR/2000/REC-xml-20001006", the contents of which are hereby incorporated herein by reference, may be used. However, as will be appreciated by those of ordinary skill in the art, the functionality of storing XML description files is not dependent on the use of any given programming language or database system.

Each application definition file is formatted according to defined rules and uses pre-determined XML markup tags, known by both virtual machine software 24, and complementary middleware server software 68. Tags define XML entities used as building blocks to present an application at a mobile device. Knowledge of these rules, and an understanding of how each tag and section of text should be interpreted, allows virtual machine software 24 to process an XML application definition and thereafter execute an application, as described below. Virtual machine software 24 effectively acts as an interpreter for a given application definition file.

Figure 4:
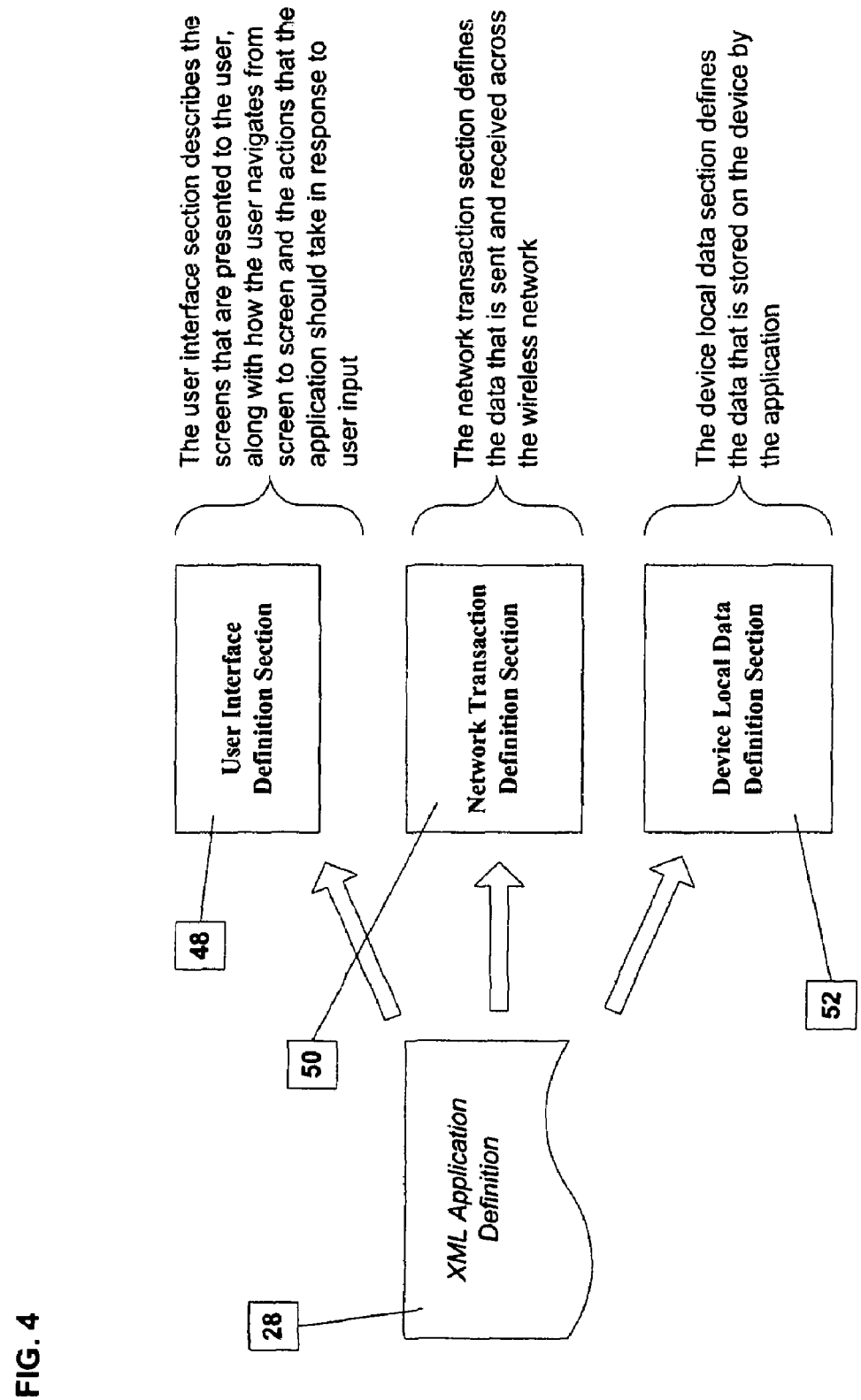
FIG. 4 illustrates the structure of example application definitions stored at a server of FIG. 2 used by the device of FIG. 1.

FIG. 4 illustrates an example format for an XML application definition file 28. As illustrated, the example application definition file 28 for a given device and application includes three components: a user interface definition section 48, specific to the user interface for the device 10, and defining the format of screen or screens for the application and how the user interacts with them; a network transactions definition section 50 defining the format of data to be exchanged with the application; and a local data definition section 52 defining the format of data to be stored locally on the mobile device by the application.

Defined XML markup tags correspond to XML entities supported at a device, and are used to create an application definition file 28. The defined tags may broadly be classified into three categories, corresponding to the three sections 48, 50 and 52 of an application definition file 28.

Example XML tags and their corresponding significance are detailed in Appendix "A". As noted above, virtual machine software 24 at a mobile device includes object classes corresponding to each of the XML tags. At run time, instances of the objects are created as required.

Broadly, the following example XML tags may be used to define the user interface definition:

SCREEN—this defines a screen. A SCREEN tag pair contains the definitions of the user interface elements (buttons, radio buttons, and the like) and the events associated with the screen and its elements BUTTON—this tag defines a button and its associated attributes LIST—this tag defines a list box CHOICEBOX—this tag defines a choice item, that allows selection of a value from predefined list MENU—the application developer will use this tag to define a menu for a given screen EDITBOX—this tag defines an edit box TEXT ITEM—this tag describes a text label that is displayed CHECKBOX—this tag describes a checkbox HELP—this tag can define a help topic that is used by another element on the screen IMAGE—this tag describes an image that appears on those displays that support images ICON—this tag describes an icon EVENT—this defines an event to be processed by the virtual machine software. Events can be defined against the application as a whole, individual screens or individual items on a given screen. Sample events would be receipt of data over the wireless interface, or a edit of text in an edit box ACTION—this describes a particular action that might be associated with an event handler. Sample actions would be navigating to a new window or displaying a message box.

The second category of example XML tags describes the network transaction section 50 of application definition 28. These may include the following example XML tags;

TABLEUPDATE—using this tag, the application developer can define an update that is performed to a table in the device's local storage. Attributes allow the update to be performed against multiple rows in a given table at once;

PACKAGEFIELD—this tag is used to define a field in a data package that passes over the wireless interface The third category of XML tags used to describe an application are those used to define a logical database that may be stored at the mobile device. The tags available that may be used in this section are:

TABLE—this tag, and its attributes, define a table. Contained within a pair of TABLE tags are definitions of the fields contained in that table. The attributes of a table control such standard relational database functions as the primary key for the table.

FIELD—this tag describes a field and its attributes. Attributes of a field are those found in a standard relational database system, such as the data type, whether the field relates to one in a different table, the need to index the field, and so on.

As well as these XML tags, virtual machine software 24 may, from time to time, need to perform certain administrative functions on behalf of a user. In order to do this, one of object classes 69 has its own repertoire of tags to communicate its needs to the middleware server 44. Such tags differ from the previous three groupings in that they do not form part of an application definition file, but are solely used for administrative communications between the virtual machine software 24 and the middleware server 44. Data packages using these tags are composed and sent due to user interactions with the virtual machine's configuration screens. The tags used for this include, REG—this allows the application to register and deregister a user for use with the middleware server FINDAPPS—by using this operation, users can interrogate the server for the list of applications that are available to them APP REG—using this operation, the end-user can register (or deregister) for an application and have the application interface downloaded automatically to their device (or remove the interface description from the device's local storage).

SETACTIVE—If the user's preferred device is malfunctioning, or out of power or coverage, they will need a mechanism to tell the Server to attempt delivery to a different device.

Figure 5:
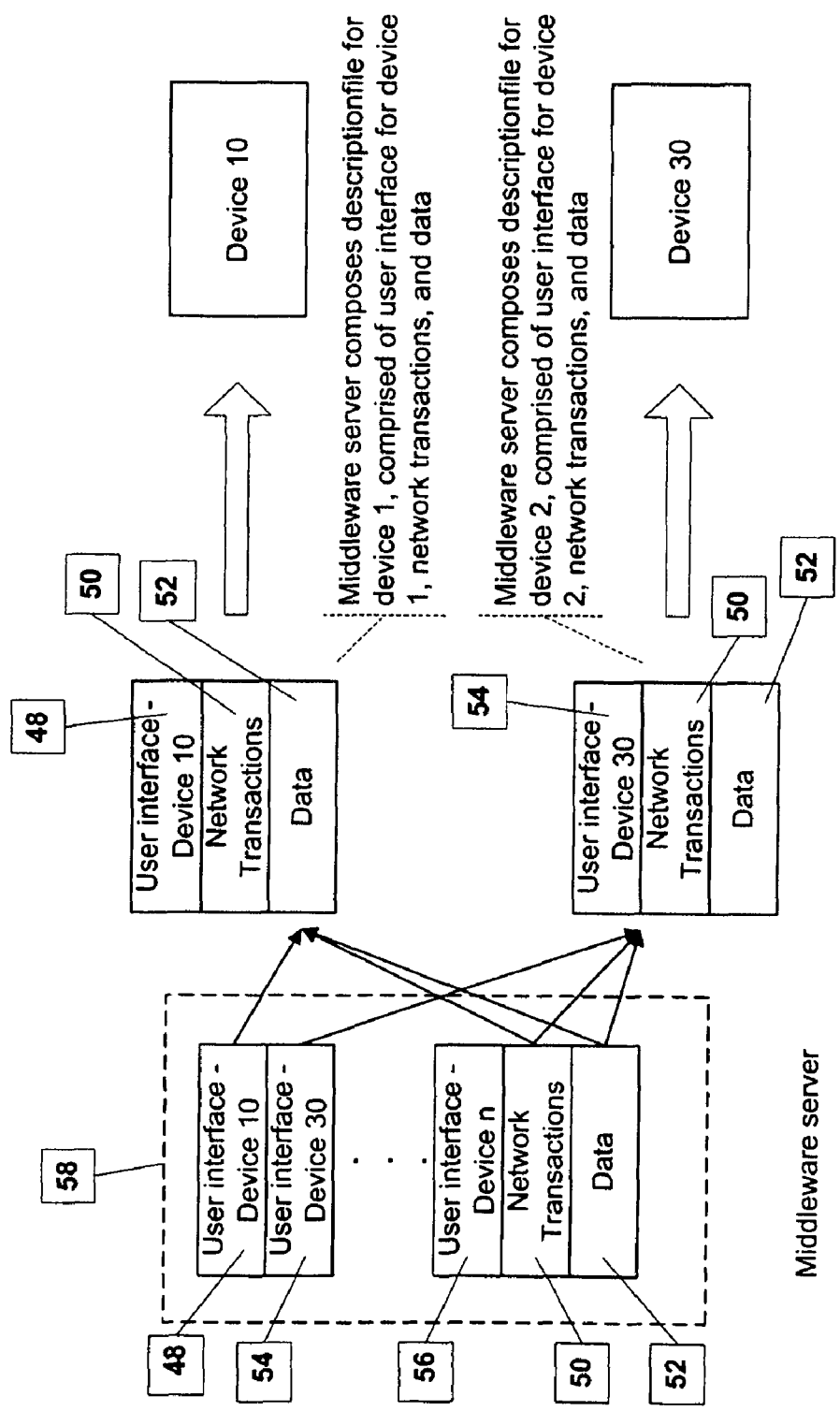
FIG. 5 schematically illustrates the formation of application definition files at a middleware server of FIG. 2

The SETACTIVE command allows the user to set the device that they are currently using as their active one FIG. 5 illustrates the organization of application definitions at middleware server 44 and how middleware server 44 may form an application definition file 28 (FIG. 4) for a given device 10, 30, 32 or 34. In the illustration of FIG. 5, only two mobile devices 10 and 30 are considered. Typically, since network transactions and local data are the same across devices, the only piece of the application definition that varies for different devices is the user interface definition.

So, middleware server 44 stores a master definition 58 for a given server side application. This master definition 58 contains example user interface descriptions 48, 54, 56 for each possible mobile device 10, 30, 32; descriptions of the network transactions 50 that are possible and data descriptions 52 of the data to be stored locally on the mobile device. Preferably, the network transactions 50 and data descriptions 52 will be the same for all mobile devices 10, 30 and 32.

For device 10, middleware server 44 composes an application definition file 28 by querying the device type and adding an appropriate user interface description 48 for device 10 to the definitions for the network transactions 50 and the data 52. For device 30, middleware server 44 composes the application definition by adding the user interface description 54 for device 10 to the definitions for the network transactions 50 and data 52.

The master definition 58 for a given application is created away from the middleware server and loaded onto the middleware server by administrative staff charged with its operation. Master definition files could be created either by use of a simple text editor, or by a graphical file generation tool. Such a tool might generate part or all of the file, using knowledge of the XML formatting rules, based on the user's interaction with screen painters, graphical data definition tools and the like.

Figure 6:
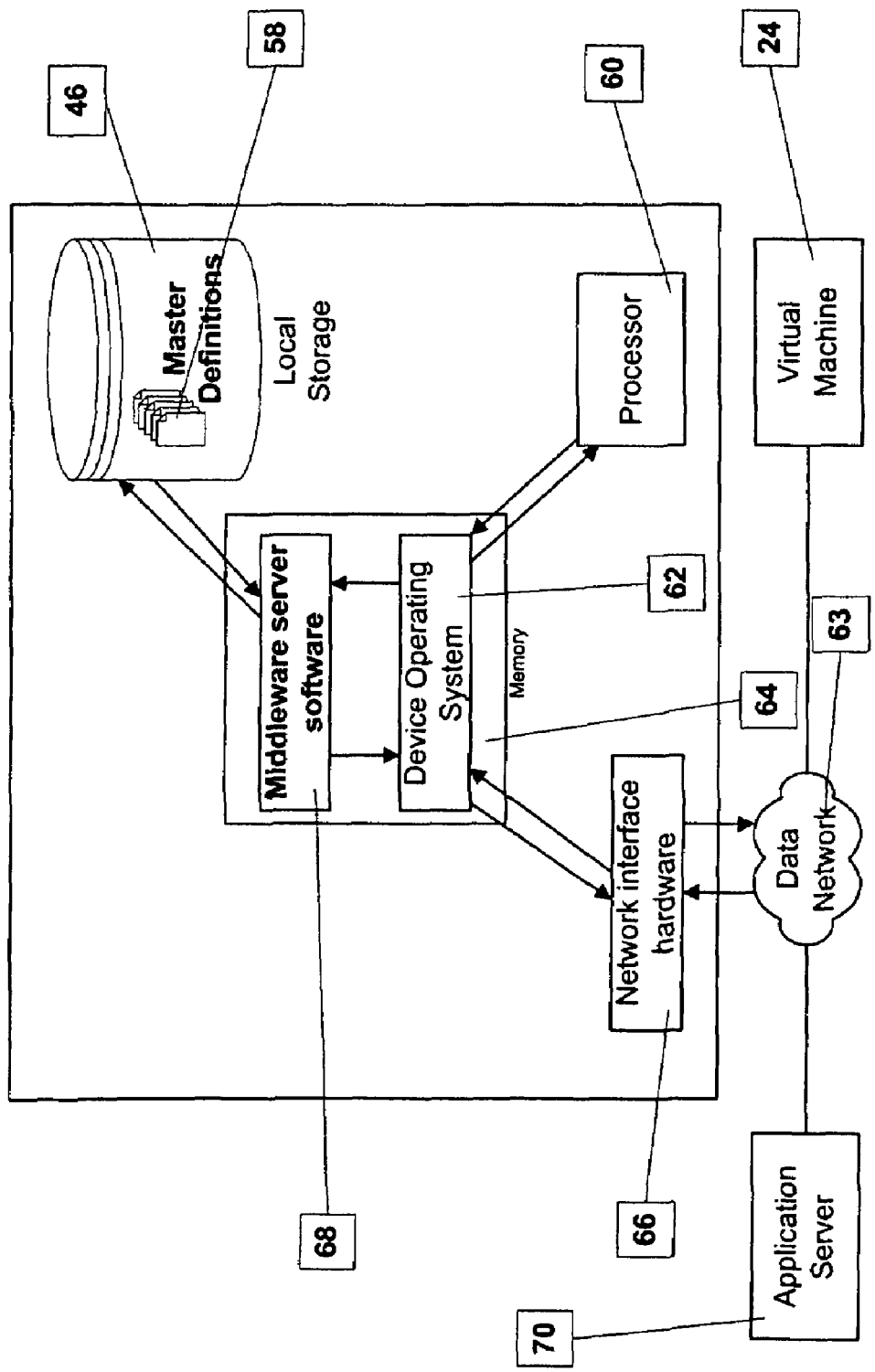
FIG. 6 schematically illustrates the middleware server of FIG. 2, exemplary of an embodiment of the present invention, including an application definitions database, further exemplary of an embodiment of the present invention.

FIG. 6 illustrates the organization of middleware server 44 and associated master definitions. Middleware server 44 may be any conventional application server, modified to function in manners exemplary of the present invention. As such, middleware server 44 includes a processor 60, in communication with a network interface 66 and storage memory 64. Middleware server 44 may be, for example, be a Windows NT server, a Sun Solaris server, or the like. Memory of middleware server 44 stores an operating system such as Windows NT, or Solaris operating system software 62.

Network interface 66 enables middleware server 44 to transmit and receive data over a data network 63. Transmissions are used to communicate with both the virtual machine software 24 (via the wireless networks 36, 38 and wireless gateways 40,42) and one or more application servers, such as application server 70, that are the end recipients of data sent from the mobile client applications and the generators of data that is sent to the mobile client applications.

Memory at middleware server 44 further stores software 68, exemplary of an embodiment of the present invention. Middleware server software 68, when executed by middleware server 44 enables the middleware server to understand and compose XML data packages that are sent and received by the middleware server. These packages may be exchanged between middleware server 44 and the virtual machine software 24, or between the middleware server 44 and the application server 70.

As described above, communication between the application server 70 and the middleware server 44 uses HTTP running on top of a standard TCP/IP stack. An HTTP connection between a running application at the application server 70 and the middleware server 44 is established in response to the application at a mobile device presenting the application. The server side application provides output to middleware server 44 over this connection. The server side application data is formatted into appropriate XML data packages understood by the virtual machine software 24 at a mobile device by the server side application.

That is, a server side application (or an interface portion of the application) formats application output into XML in a manner consistent with the format defined by the application definition file for the application. Alternatively, an interface component separate from the application could easily be formed with an understanding of the format and output for a particular application. That is, with a knowledge of the format of data provided and expected by an application at application server 70, an interface component could be a produced using techniques readily understood by those of ordinary skill. The interface portion could translate application output to XML, as expected by middleware server 44. Similarly, the interface portion may translate XML input from a mobile device into a format understood by the server side application.

The particular identity of the mobile device on which the application is to be presented may be identified by a suitable identifier, in the form of a header contained in the server side application output. This header may be used by middleware server 44 to forward the data to the appropriate mobile device. Alternatively, the identity of the connection could be used to forward the data to the appropriate mobile device.

Figure 7:
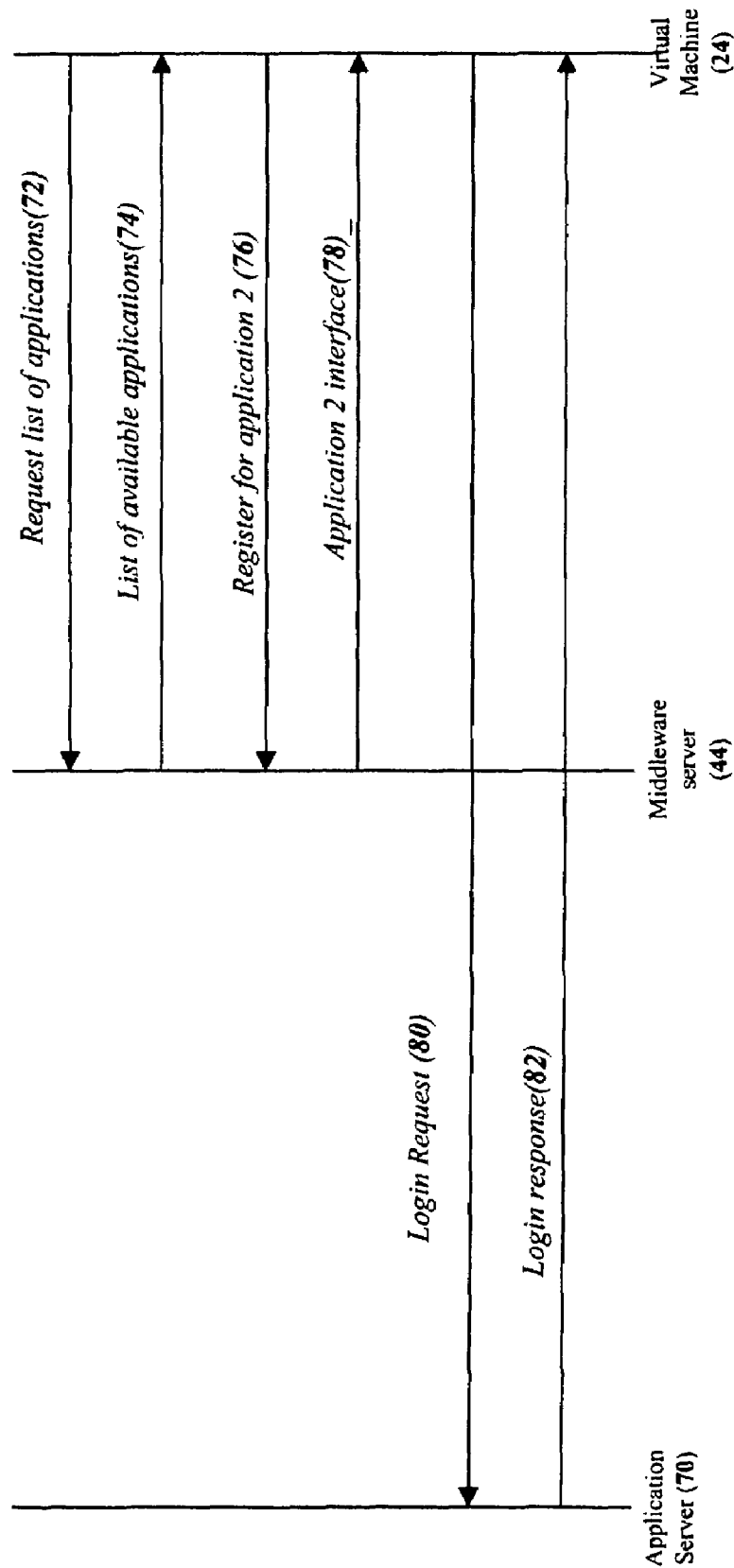
FIG. 7 is a flow diagram illustrating the exchange of sample messages passed between a mobile device, middleware server and application server of FIG. 2.

FIG. 7 illustrates a flow diagram detailing data (application data or application definition files 28) flow between mobile device 10 and middleware server 44, in manners exemplary of an embodiment of the present invention.

For data requested from middleware server 44, device 10, under software control by virtual machine software 24 makes requests to middleware server 44 (also illustrated in FIG. 2), which passes over the wireless network 36 through network gateway 40. Network gateway 40 passes the request to the middleware server 44. Middleware server 44 responds by executing a database query on its database 46 that finds which applications are available to the user and the user's mobile device. For data passed from middleware server 44 to device 10, data is routed through network gateway 40. Network gateway 40 forwards the information to the user's mobile device over the wireless network 36.

FIG. 7 when considered with FIG. 3 illustrates a sequence of communications between device 10, and middleware server 44 that may occur when the user of a mobile device wishes to download an application definition file 28 for a server side application.

So, initially, device 10 interrogates server 44 to determine which applications are available for the particular mobile device being used. This may be accomplished by the user instructing the virtual machine software 24 at device 10 to interrogate the server 44. Responsive to these instructions the virtual machine software 24 sends an XML message to the server requesting the list of applications (data flow 72); as illustrated in FIG. 7 the XML message may contain the <FINDAPPS> tag, signifying to the middleware server 44, its desire for a list available application. In response, middleware server 44 makes a query to database 46. Database 46, responsive to this query, returns a list of applications that are available to the user and the mobile device. The list is typically based, at least in part, on the type of mobile device making the request, and the applications known to middleware server 44. Middleware server 44 converts this list to an XML message and sends to the virtual machine (data flow 74). Again, a suitable XML tag identifies the message as containing the list of available applications.

Figure 8:
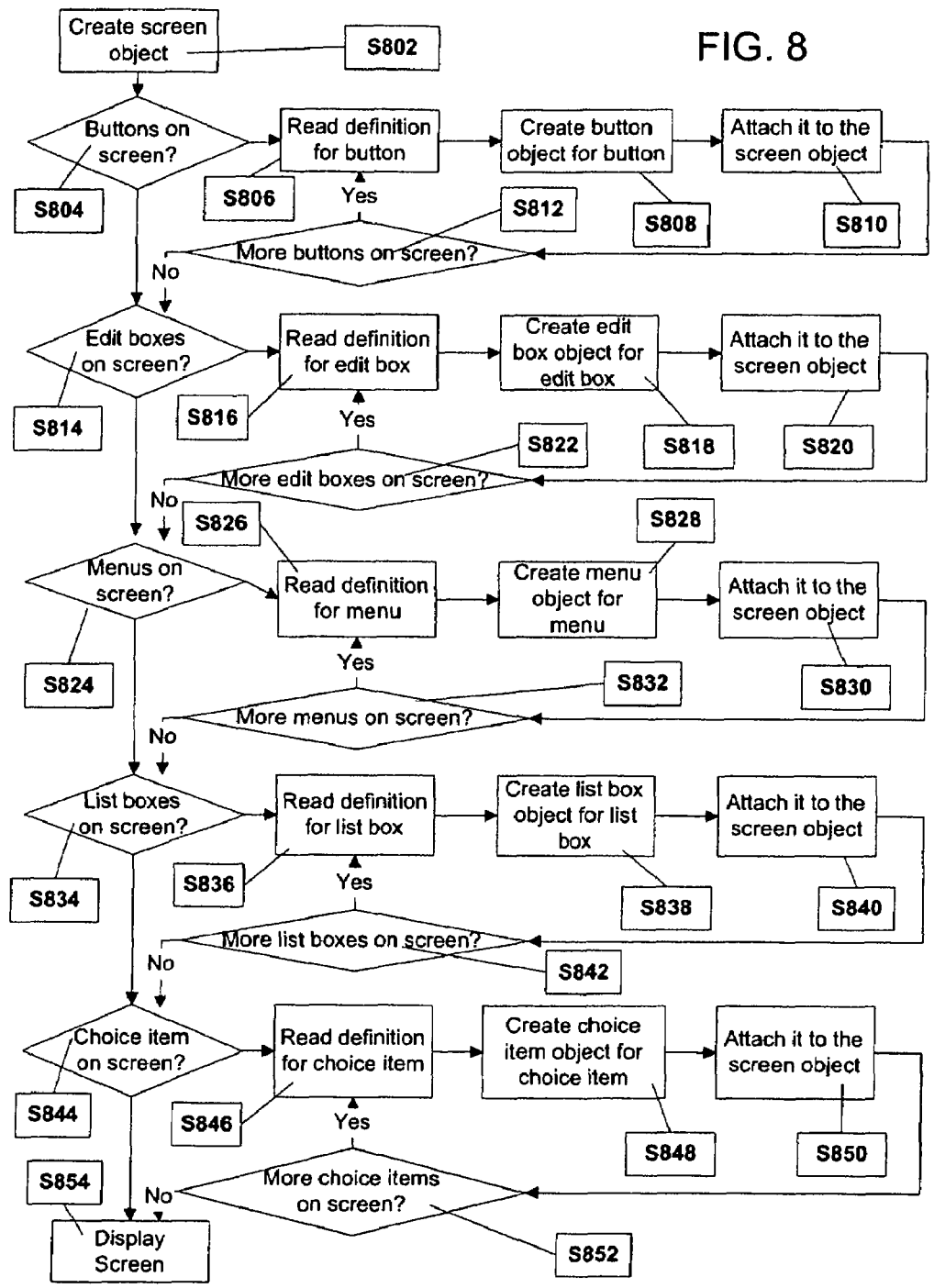
FIG. 8-10 illustrate steps performed at a mobile device under control of virtual machine software of FIG. 2.

In response, a user at device 10 may choose to register for an available server side application. When a user chooses to register for an application, virtual machine software 24 at device 10 composes and sends an XML registration request for a selected application (data flow 76) to middleware server 44. As illustrated in FIG. 8, an XML message containing a <REG> tag is sent to middleware server 44. The name of the application is specified in the message. The middleware server 44, in response, queries its database for the user interface definition for the selected application for the user's mobile device. Thereafter, the middleware server creates the application definition file, as detailed with reference to FIG. 5. Then, middleware server 44 sends to the mobile device (data flow 78) the created application definition file 28.

The user is then able to use the functionality defined by the interface description to send and receive data.

At this time, parser 61 of virtual machine software 24 may parse the XML text of the application definition file to form a tokenized version of the file. That is, each XML tag may be converted a defined token for compact storage, and to minimize repeated parsing of the XML text file. The tokenized version of the application definition file may be stored for immediate or later use by device 10.

Thereafter, upon invocation of a particular application for which the device 10 has registered, the screen generation engine 67 of the virtual machine software 24 at the device causes the virtual device to locate the definition of an initial screen for that application. The initial screen is identified within the application definition file 28 for that application using a <SCREEN> tag, and an associated attribute of <First screen="yes">.

Steps performed by virtual machine software 24 in processing this screen (and any screen) are illustrated in FIG. 8. As illustrated, screen generation engine 67, generates an instance of an object class, defining a screen by parsing the section of the XML application definition file corresponding to the <SCREEN> tag in step S802. Supported screen elements may be buttons, edit boxes, menus, list boxes, and choice items, as identified in sections 5.3, 5.4, and 5.5 of Appendix "A". Other screen elements, such as images and checkboxes, as detailed in Appendix "A" may also be supported. For clarity of illustration, their processing by screen generation engine 67 however, is not detailed. Each supported tag under the SCREEN definition section, in turn causes creation of instances of object classes within the virtual machine software 24. Typically, instances of objects corresponding to the tags, used for creation of a screen, result in presentation of data at mobile device 10. As well the creation of such objects may give rise to events (e.g. user interaction) and actions to be processed at device 10.

Figure 9:
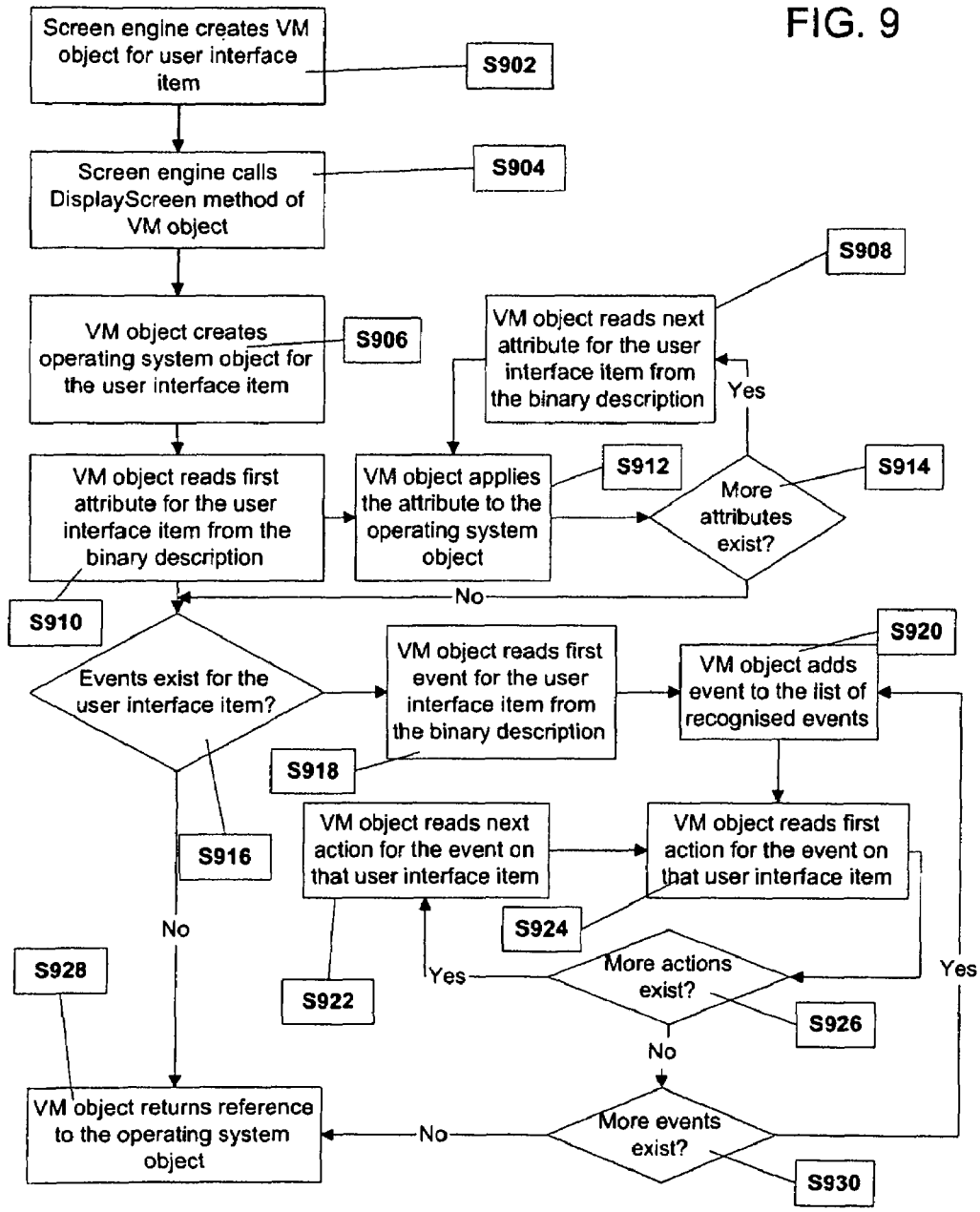

Each element definition causes virtual machine software 24 to use the operating system of the mobile device to create corresponding display element of a graphical user interface as more particularly illustrated in FIG. 9. Specifically, for each element, the associated XML definition is read in step S806, S816, S826, S836, and S846, and a corresponding instance of a screen object defined as part of the virtual machine software 24 is created by the virtual machine software 24 in steps S808, S818, S828, S838 and S848, in accordance with steps S902 and onward illustrated in FIG. 9. Each interface object instance is created in step S902. Each instance takes as attribute values defined by the XML text associated with the element. A method of the virtual object is further called in step S904, and causes a corresponding device operating system object to be created. Those attributes defined in the XML text file, stored within the virtual machine object instance are applied to the corresponding instance of a display object created using the device operating system in steps S908S-S914. These steps are repeated for all attributes of the virtual machine object instance. For any element allowing user interaction, giving rise to an operating system event, the event handler 65 of virtual machine software 24 is registered to process operating system events, as detailed below.

Additionally, for each event (as identified by an <EVENT> tag) and action (as identified by an <ACTION> tag) associated with each XML element, virtual machine software 24 creates an instance of a corresponding event and action object forming part of virtual machine software 24. Virtual machine software 24 further maintains a list identifying each instance of each event and action object, and an associated identifier of an event in steps S916 to S928.

Steps S902-S930 are repeated for each element of the screen in steps S808, S818, S828, S838 and S848 as illustrated in FIG. 8. All elements between the <SCREEN> definition tags are so processed. After the entire screen has been so created in memory, it is displayed in step S854, using conventional techniques.

As will be appreciated, objects specific to the type of device executing the virtual machine software 24. Functions initiated as a result of the XML description may require event handling. This event handling is processed by event handler 65 of virtual machine software 24 in accordance with the application definition file 28. Similarly, receipt of data from a mobile network will give rise to events. Event handler 65, associated with a particular application presented at the device similarly processes incoming messages for that particular application. In response to the events, virtual machine software 24 creates instance of software objects, and calls functions of those object instances, as required by the definitions contained within the XML definitions contained within the application definition file 28, giving rise to the event.

As noted, the virtual machine software 24 includes object classes, allowing the virtual machine to create object instances corresponding to an <EVENT> tag. The event object classes includes methods specific to the mobile device that allow the device to process each of the defined XML descriptions contained within the application definition file, and also to process program/event flow resulting from the processing of each XML description.

Figure 10:
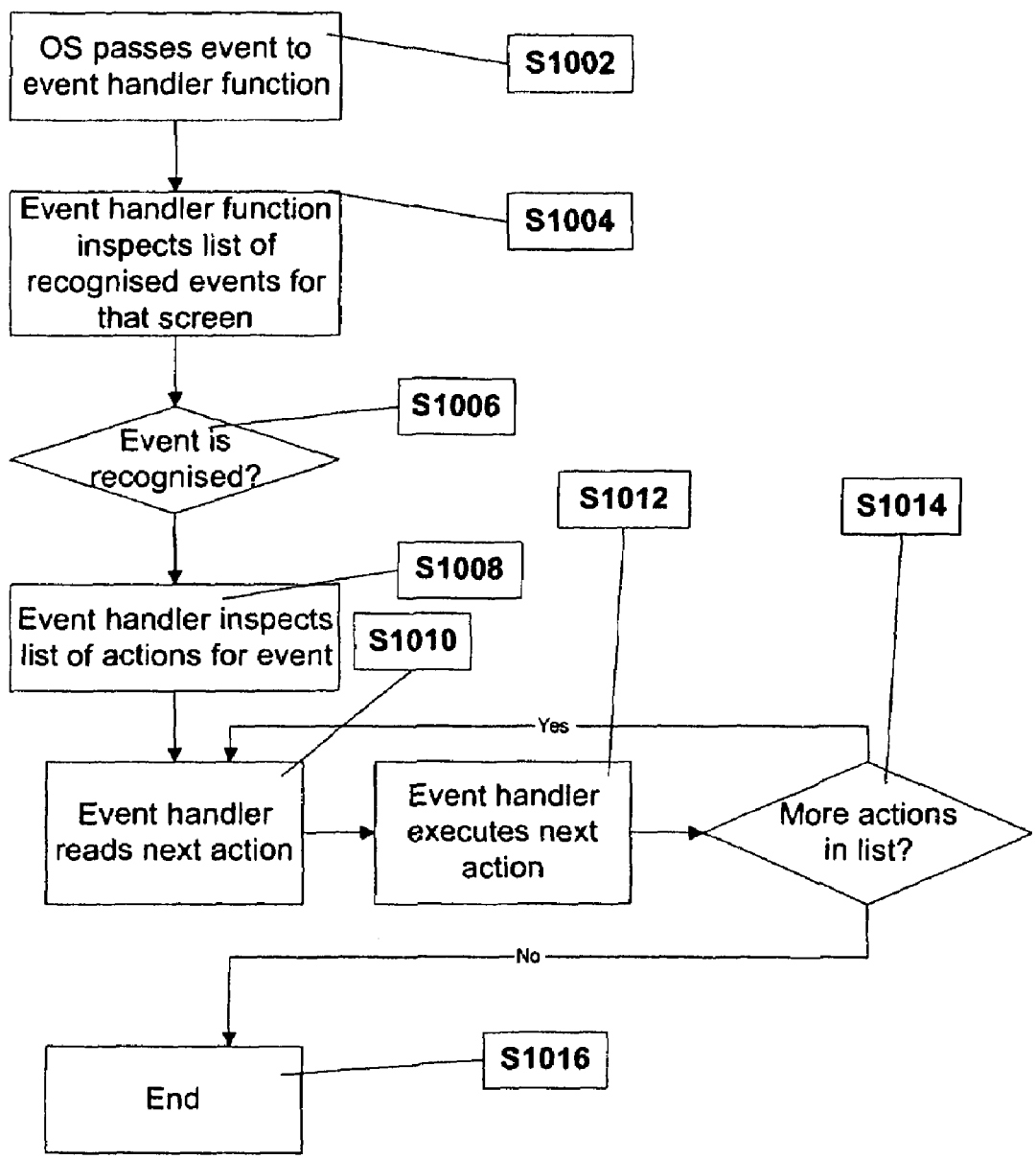

Events may be handled by virtual machine software 24 as illustrated in FIG. 10. Specifically, as device handler 65 has been registered with the operating system for created objects, upon occurrence of an event, steps S1002 and onward are performed in response to the operating system detecting an event.

An identifier of the event is passed to event handler 65 in step S1002. In steps S1004-S1008, this identifier is compared to the known list of events, created as a result of steps S916-S930. For an identified event, actions associated with that event are processed in step S1008-S1014.

That is, virtual machine software 24 performs the action defined as a result of the <ACTION> tag associated with the <EVENT> tag corresponding to the event giving rise to processing by the event handler 65. The <ACTION> may cause creation of a new screen, as defined by a screen tag, a network transmission, a local storage, or the like.

New screens, in turn, are created by invocation of the screen generation engine 61, as detailed in FIGS. 8 and 9. In this manner the navigation through the screens of the application is accomplished according to the definition embodied in the XML application description.

Similarly, when the user wishes to communicate with the middleware server, or store data locally, event handler 65 creates instances of corresponding object classes within the object classes 69 of virtual machine software 24 and calls their methods to store or transmit the data using the local device operating system. The format of data is defined by the device local definition section 52; the format of network packages is defined in the network transaction package definition section 50.

For example, data that is to be sent to the wireless network is assembled into the correct XML packages using methods within an XML builder object, formed as a result of creating an instance of a corresponding object class within object classes 69 of virtual machine software 24. Methods of the XML builder object create a full XML package before passing the completed XML package to another message server object. The message server object uses the device's network APIs to transmits the assembled data package across the wireless network.

Received XML data packages from network 63 (FIG. 2) give rise to events processed by event handler 65. Processing of the receipt of data packages is not specifically illustrated in FIG. 9. However, the receipt of data triggers a "data" event of the mobile device's operating system. This data event is passed to the virtual machine, and event handler 65 inspects the package received. As long as the data received is a valid XML data package as contained within the application definition, the virtual machine inspects the list of recognised XML entities.

So, for example, a user could send a login request 80 by interacting with an initial login screen, defined in the application definition file for the application. This would be passed by the middleware server 44 to the backend application server 70. The backend application server according to the logic embedded within its application, would return a response, which the middleware server 44 would pass to the virtual machine software 24. Other applications, running on the same or other application servers might involve different interactions, the nature of such interactions being solely dependent on the functionality and logic embedded within the application server 70, and remaining independent of the middleware server 44.

FIG. 11 illustrates sample XML messages passed as the result of message flows illustrated in FIG. 6. For each message, the header portion, between the <HEAD> . . . </HEAD> tags contains a timestamp and the identifier of the sending device.

Example message 72 is sent by the mobile device to request the list of applications that the server has available to that user on that device. It specifies the type of device by a text ID contained between the <PLATFORM> . . . </PLATFORM> tags. Example message 74 is sent in response to message 70 by middleware server 44 to the mobile device 10. It contains a set of <APP> . . . </APP> tag pairs, each of which identifying a single application that is available to the user at device 10. Example message 76 is sent from the mobile device 10 to middleware server 44 to register for a single server side application. The tags specify information about the user. Message 78 is sent by the middleware server 44 to the mobile device in response to a request to register device 10 for an application. The pair of tags <VALUE> . . . </VALUE> gives a code indicating success or failure. In the sample message shown, a success is shown, and is followed by the interface description for the application, contained between the <INTERFACE> . . . </INTERFACE> tags. This interface description may then be stored locally within memory 16 of device 10.

As noted, when a user starts an application that has been downloaded in the manner described above, the virtual machine software 24 reads the interface description that was downloaded for that device 10, and the virtual machine software 24 identifies the screen that should be displayed on startup, and displays its elements as detailed in relation to FIGS. 9 and 10. The user may then use the functionality defined by the user interface definition section 48 of the application definition 28 to send and receive data from a server side application.

Figure 12:
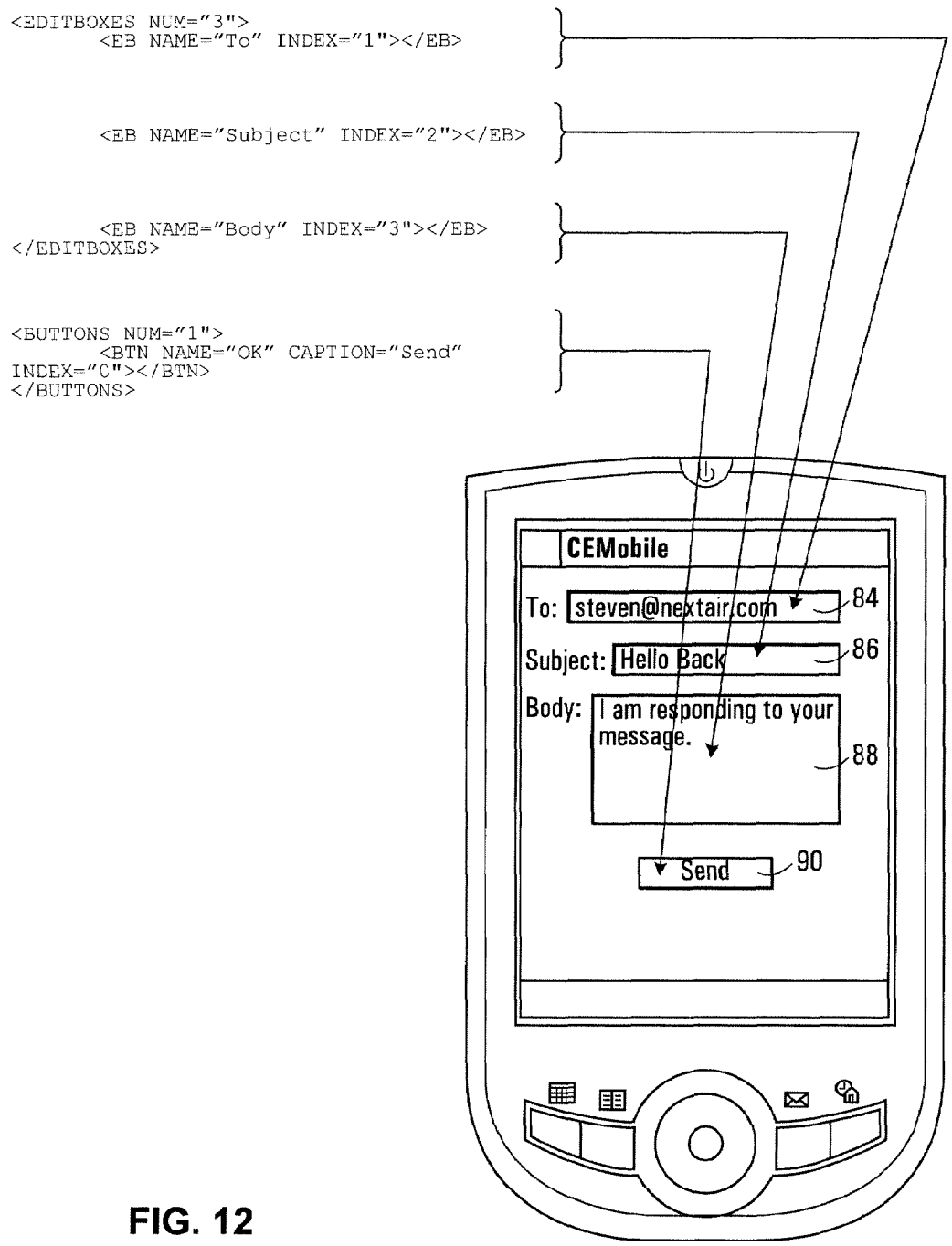
FIG. 12 illustrates a presentation of a user interface for a sample application at a mobile device.
Figure 13:
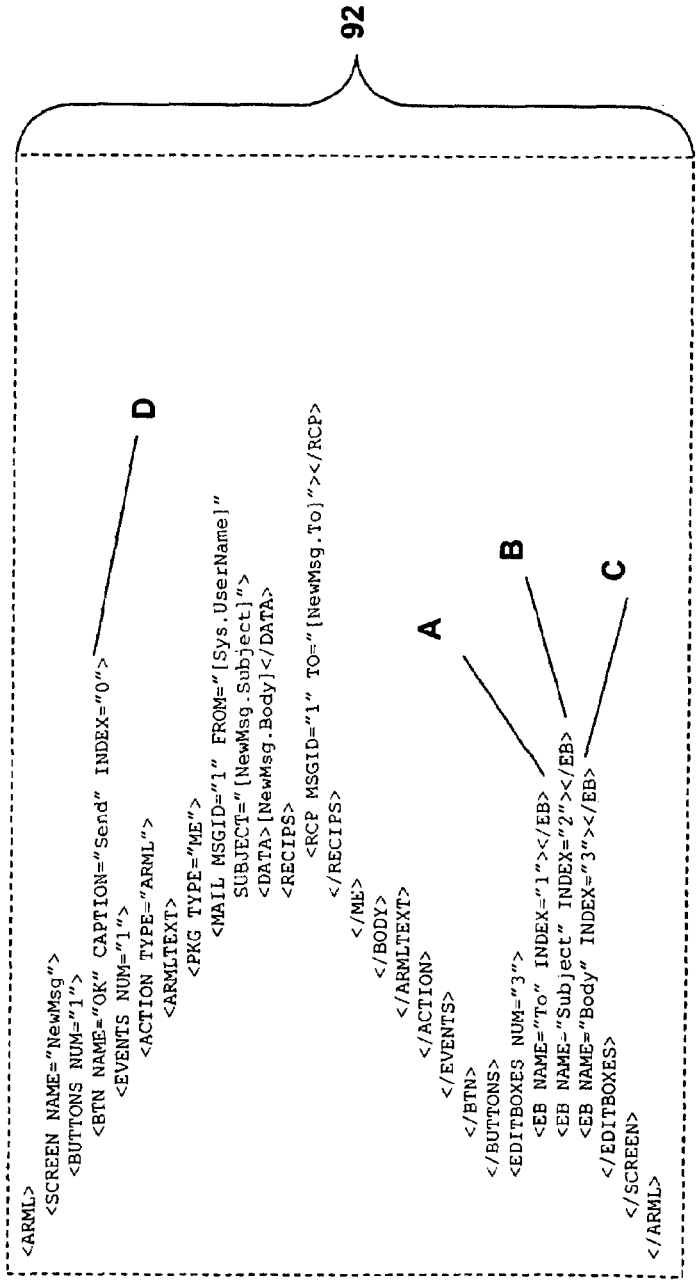
FIG. 13 illustrates a sample portion of an application definition file defining a user interface illustrated in FIG. 12.

For the purposes of illustration, FIGS. 12 and 13 illustrate the presentation of a user interface for a sample screen on a Windows CE Portable Digital Assistant. As illustrated in FIG. 13, a portion of an application definition file 28 defines a screen with the name 'New Msg'. This interface description may be contained within the user interface definition section 48 of an application definition file 28 associated with the application. The screen has a single button identified by the <'BTN NAME'="OK", CAPTION="Send" INDEX="0"> tag, and identified as item D in FIG. 12. This button gives rise to a single event, (identified by the <EVENTS NUM="1" tag) giving rise to a single associated action (defined by the tag <ACTION TYPE="ARML">). This action results in the generation of a network package (defined by the tag <PKG TYPE="ME">), having an associated data format as defined between the corresponding tags. Additionally, the screen defines three editboxes, as defined after the <EDITBOX-ESNUM=3> tag, and identified as items A, B, and C.

Upon invocation of the application at the local device, screen generation engine 67 of virtual machine software 24 at the device process the screen definition, as detailed with reference to FIGS. 8 and 9. That is, for each tag D, the screen generation engine 67 creates a button object instance, in accordance with steps S804-S812. Similarly for each tag A, B and C within the application definition file, virtual machine software 24 at the device creates instances of edit box objects (i.e. steps S834-S842 (FIGS. 8 and 9)). The data contained within the object instances reflects the attributes of the relevant button and edit box tags, contained in the application definition 28 for the application.

The resulting screen at the mobile device is illustrated in FIG. 12. Each of the screen items is identified with reference to the XML segment within XML portion 92 giving rise to the screen element. The user interface depicts a screen called 'NewMsg', which uses the interface items detailed in FIG. 8., but which adds the ability to compose and send data. This screen has three edit boxes, named 'To', 'Subject' and 'Body' as displayed in FIG. 8 (84,86,88); these are represented by the XML tags A, B and C. The screen also incorporates a button, named 'OK', also as displayed in FIG. 12 (90), which is represented by the XML tag D.

Call-backs associated with the presented button cause graphical user interface application software/operating system at the mobile device to return control to the event handler 65 of virtual machine software 24 at the device. Thus, as the user interacts with the application, the user may input data within the presented screen using the mobile device API. Once data is to be exchanged with middleware server 44, the user may press the OK button, thereby invoking an event, initially handled by the operating system of the mobile device. However, during the creation of button D, in steps S804-S810 any call-back associated with the button was registered to be handled by event handler 65 of virtual machine software 24. Upon completion, virtual machine software 24 receives data corresponding to the user's interaction with the presented user interface and packages this data into XML messages using corresponding objects, populated according to the rules within the application definition file.

Event handler 65, in turn processes the event caused by interaction of the button in accordance with the <EVENT> tag and corresponding <ACTION> tag associated with the button D. The events, and associated actions are listed as data items associated with the relevant user interface item, as result of the EVENT and ACTION tags existing within the definitions of the relevant user interface item, within the application definition file. This <ACTION> tag causes the virtual machine software 24 to create an instance of an object that sends an XML package to the middleware server in accordance with the format defined between the <ACTION> tag. That is, a "template" (defined after the <PKG TYPE="ME"> tag) for the XML package to be sent is defined against the EVENT handler for a given user interface item. This template specifies the format of the package to be sent, but will include certain variable fields. These are pieces of data in the formatted XML package that will vary according to the values contained in data entry fields on the current and previous screens. The definition of the template specifies which data entry field should be interrogated to populate a given entry within a data package that is to be sent.

This template fills some of its fields dynamically from data inserted by a user into edit boxes that were presented on the mobile device's screen. The template has within it certain placeholders delimited by square brackets ([,]). These placeholders specify a data source from which that section of the template should be filled. A data source might be a user interface field on the current screen, a user interface field on the previous screen, or a database table. Virtual machine software 24, reading the data source name, searches for the field corresponding to that data source and replaces the placeholder with actual data contained within the data source. For example, the SUBJECT attribute of the MAIL tag in XML portion 92 is read from the edit box named 'Subject' on the screen named 'NewMsg' This process is repeated for each such placeholder, until the virtual machine, reading through the template has replaced all placeholders in the template. At this point the template has been converted into a well-formed XML message 94.

Figure 14:
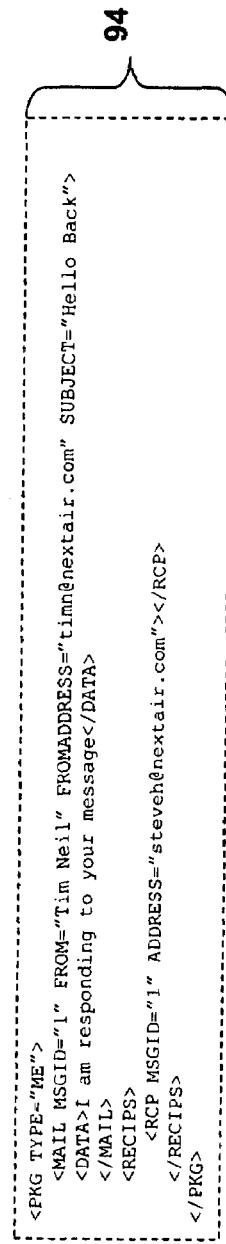
FIG. 14 illustrates the format of a message formed in accordance with the sample portion of an application definition file of FIG. 13.

A resulting XML message 94 containing data formed as a result of input provided to the fields of the "NewMsg" screen is illustrated in FIG. 14. This exemplary XML message 94 that is created by pressing the button 90 in XML message portion 92. In this case, the editbox 86 named 'Subject' contains the text "Hello Back"; the editbox 84 named 'To' contains the text "steveh@nextair.com"; and the editbox 88 named 'Body' contains the text "I am responding to your message".

The virtual machine software 24 using the template inspects these three fields, and places the text contained within each edit box in the appropriate position in the template. For example, the placeholder [NewMsg.Subject] is replaced by "Hello Back". The virtual machine software 24, inspecting the template contained in the XML message portion 92 and populating the variable fields, creates the sample XML message 94 by invoking the functionality embedded within an XML builder software object. Once the XML message 94 has been assembled in this fashion, the relevant method of the message server object is then invoked to transmit the XML message 94 in a data package across the network.

Similarly, when data is received, the event handler 65 of the virtual machine software 24 is notified. In response, the event handler examines the data package that it has received using the parser 61 to build a list of name value pairs containing the data received. Thereafter, methods within an object class for processing incoming packets are invoked to allow virtual machine software 24 to inspect the application definition for the application to identify the fields in the database and user interface screens that need to be updated with the new data. Where screens are updated, this is done according to the procedures normal to that device.

Handling of incoming packages is defined in the application definition file 28 at the time the application description file was downloaded. That is, for each of the possible packages that can be received, application description file 28 includes definitions of database tables and screen items that should be updated, as well as which section of the package updates which database or screen field. When a package is received, event handler 65 of virtual machine software 24 uses rules based on the application description file 28 to identify which database and screen fields need to be updated.

Figure 15A:
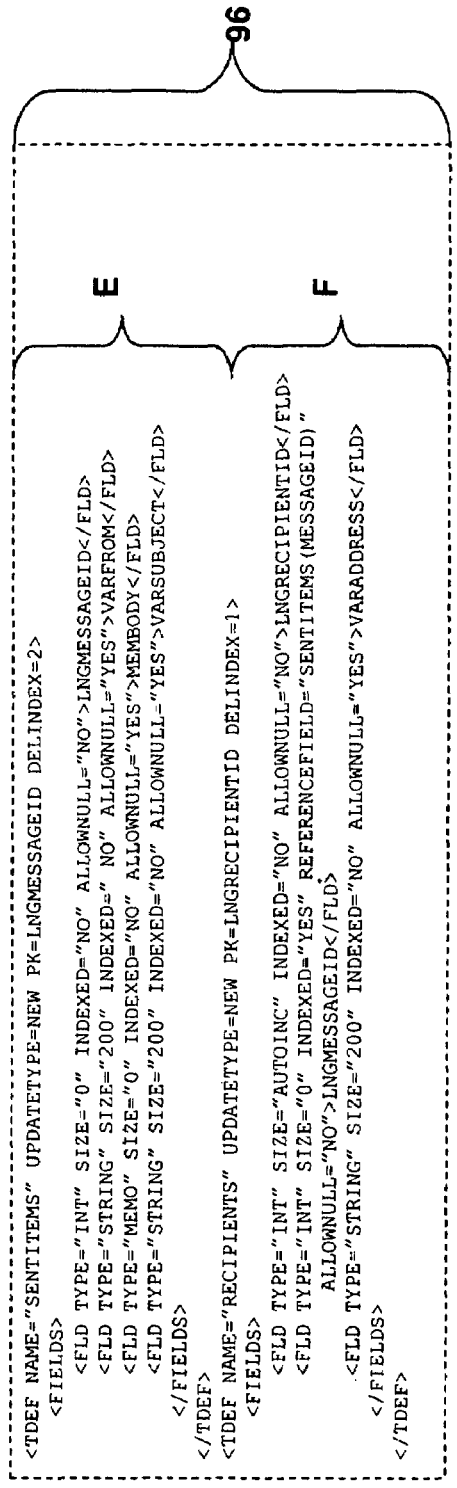
FIG. 15A illustrates a sample portion of an application definition file defining a local storage at a mobile device.
Figure 15B:
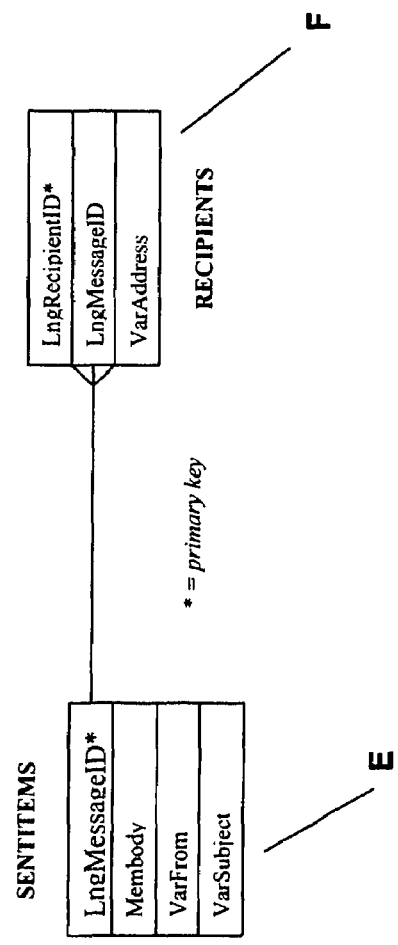
FIG. 15B schematically illustrates local storage in accordance with FIG. 15A.

FIGS. 15A-15C similarly illustrates how local storage on the device, and the messages that update it, are defined in the application definition file 28. XML portion 96 forming part of the device local definition section 52 of an application definition defines an example format of local storage for the email application described in FIGS. 12 and 13. Two example tables, labeled E and F are defined in the local storage for the application. One table (E) stores details of sent emails. A second table (F) stores the recipients of sent emails. The first table E, "SentItems", has four fields; the second table F, "Recipients" has three fields. This is illustrated in graphical form below the XML fragment.

FIGS. 15A and 15B further illustrates the use of local storage to store to data packages that are sent and received. Specifically, as illustrated in FIG. 15A the table given in FIG. 15A may store an email contained in the example message 94, shown in FIG. 14. So application definition file 28 for this application would contain, along with XML message portions 92 and XML portion 96, the XML fragment 102. XML fragment 102 defines how the data packages composed by the XML message portion 92 (an example of which was illustrated in FIG. 13), updates the tables defined by the XML portion 96.

XML fragment 102 includes two sections 104 and 106. First section 104 defines how the fields of the data package would update the "SentItems" table E. An example line 108 describes how the 'MSGID' field in the data package would update the 'LNGMESSAGEID' field in the table E. Similarly, the second section 106 describes how the fields of the data package would update the "Recipients" table.

Attributes of the illustrated <AXDATAPACKET> tag instruct the virtual machine software 24 as to whether a given data package should update tables in local storage. These rules are applied whenever that package is sent or received.

As can be seen from the preceding description and example, such an approach has significant advantages over the traditional method of deploying applications onto mobile devices. First, the definition of an application's functionality is separated from the details associated with implementing such functionality, allowing the implementers of a mobile application to concentrate on the functionality and ignore implementation details. Second, application definitions can be downloaded wirelessly, wherever the device happens to be at the time. This greatly improves the usefulness of the mobile device, by removing reliance on returning the device to a cradle and running a complex installation program. Thirdly, the use of application definition files allows flexible definitions for numerous applications. Server-side application may be easily ported for a number of devices.

It will be further understood that the invention is not limited to the embodiments described herein which are merely illustrative of a preferred embodiment of carrying out the invention, and which is susceptible to modification of form, arrangement of parts, steps, details and order of operation. The invention, rather, is intended to encompass all such modification within its scope, as defined by the claims.

What is claimed is:

1. A system comprising:
a plurality of wireless mobile devices, each of a distinct device type;
a server in communication with said plurality of wireless mobile devices, said server comprising a processor in communication with memory, said memory storing:
a master definition comprising:
for each said distinct device type, a definition, in a markup language, of a user interface format for an application, said user interface format being specific to said distinct device type;
a definition, in said markup language, of a format of network messages for exchange of data generated by said application, said format of said network messages being the same for each said distinct device type; and
a definition, in said markup language, of a format for storing data related to said application at said wireless mobile device, said format for storing data being the same for each said distinct device type; and
software that, upon execution by said processor, causes said server to:
determine a device type of one wireless mobile device of said plurality;
select the definition of the user interface format that is specific to the determined device type;
add said selected definition of said user interface format to said definition of said format of network messages and said definition of said format for storing data, said adding resulting in an application definition file; and
send said application definition file to said one wireless mobile device.

2. The system of claim 1 wherein each one of said definition of said user interface format, said definition of said format of network messages, and said definition of said format for storing data is delineated from the other ones of said definitions within said master definition by a distinct markup language element.

3. The system of claim 1 wherein each one of said definition of said user interface format, said definition of said format of network messages, and said definition of said format for storing data is delineated from the other ones of said definitions within in said application definition file by a distinct markup language element.

4. The system of claim 1 further comprising an application server in communication with said server for executing said application.

5. A server for use in communicating with a plurality of wireless mobile devices, each of said wireless mobile devices being of a distinct device type, said server comprising:
a processor in communication with a network interface and storage memory, said memory storing:
a master definition comprising:
for each said distinct device type, a definition, in a markup language, of a user interface format for an application, said user interface format being specific to said distinct device type;

a definition, in said markup language, of a format of network messages for exchange of data generated by said application, said format of said network messages being the same for each said distinct device type; and a definition, in said markup language, of a format for storing data related to said application, said format for storing data being the same each said distinct device type; and software that, upon execution by said processor, causes said server to:

determine a device type of one wireless mobile device of said plurality;

select the definition of the user interface format that is specific to the determined device type;

add said selected definition of said user interface format to said definition of said format of network messages and said definition of said format for storing data, said adding resulting in an application definition file in said markup language; and send said application definition file to said one wireless mobile device.

6. The server of claim 5 wherein each one of said definition of said user interface format, said definition of said format of network messages, and said definition of said format for storing data is delineated from the other ones of said definitions within said master definition by a distinct markup language element.

7. The server of claim 5 wherein each one of said definition of said user interface format, said definition of said format of network messages, and said definition of said format for storing data is delineated from the other ones of said definitions within in said application definition file by a distinct markup language element.

8. A system comprising:

a first wireless mobile device of a first device type;

a second wireless mobile device of a second device type;

a server in wireless communication with said first and second wireless mobile devices, said server comprising a processor in communication with memory, said memory storing:

definitions, in a markup language, of each of:

a first user interface format for an application, said first user interface format being specific to said first device type;

a second user interface format for said application, said second user interface format being specific to said second device type;

a format of network messages for exchange of data generated by said application, said format of said network messages being the same for said first and second device types; and a format for storing data related to said application at said wireless mobile device, said format for storing data being the same for said first and second device types; and software that, upon execution by said processor, causes said server to:

add said definition of said first user interface format to said definition of said format of network messages and said definition of said format for storing data, said adding resulting in a first application definition file;

send said first application definition file to said first wireless mobile device;

further add said definition of said second user interface format to said definition of said format of network messages and said definition of said format for storing data, said further adding resulting in a second application definition file; and send said second application definition file to said second wireless mobile device.

9. The system of claim 8 wherein each one of said definition of said first user interface format, said definition of said second user interface format, said definition of said format of network messages, and said definition of said format for storing data is contained in a common master definition file and is delineated from the other ones of said definitions within said file by a distinct markup language element.

10. The system of claim 8 further comprising an application server in communication with said server for executing said application.

* * * * *